(12) United States Patent
Amano et al.

(10) Patent No.: US 10,986,115 B2
(45) Date of Patent: Apr. 20, 2021

(54) DATA ANALYSIS DEVICE, METHOD, AND STORAGE MEDIUM

(71) Applicant: Panasonic Intellectual Property Management Co., Ltd., Osaka (JP)

(72) Inventors: Hiroshi Amano, Osaka (JP); Yosuke Tajika, Hyogo (JP); Yuichi Higuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 16/580,853

(22) Filed: Sep. 24, 2019

(65) Prior Publication Data

US 2020/0021610 A1 Jan. 16, 2020

Related U.S. Application Data

(63) Continuation of application No. PCT/JP2018/012306, filed on Mar. 27, 2018.

(30) Foreign Application Priority Data

Mar. 27, 2017 (JP) .............................. JP2017-061210

(51) Int. Cl.
*H04L 29/06* (2006.01)
*H04L 29/12* (2006.01)
*H04L 29/08* (2006.01)

(52) U.S. Cl.
CPC ...... *H04L 63/1425* (2013.01); *H04L 61/2007* (2013.01); *H04L 69/22* (2013.01); *H04L 69/16* (2013.01)

(58) Field of Classification Search
None
See application file for complete search history.

(56) References Cited

U.S. PATENT DOCUMENTS

2012/0209411 A1* 8/2012 Ohkado ................ G06F 21/552
    700/80
2017/0126714 A1* 5/2017 Nooka ................ H04L 63/1425

FOREIGN PATENT DOCUMENTS

| JP | 2005223847 A | * | 2/2004 |
| JP | 2012-168755 A | | 9/2012 |
| JP | 2016-19028 A | | 2/2016 |

OTHER PUBLICATIONS

International Search Report and Written Opinion issued in corresponding International Patent Application No. PCT/JP2018/012306, dated Jun. 26, 2018, with partial translation.

* cited by examiner

*Primary Examiner* — J. Brant Murphy
*Assistant Examiner* — Hassan Saadoun
(74) *Attorney, Agent, or Firm* — McDermott Will & Emery LLP

(57) ABSTRACT

An abnormality in a manufacturing system is detected without extensive modification to the existing manufacturing systems. The data analysis device includes: a receiver configured to receive a packet transmitted between a manufacture control device and a manufacturing device; an analyzer configured to obtain the type of data included in a payload of the received packet from an IP address and a port number included in a header of the packet; a selector configured to select, based on the type of the data obtained by the analyzer, a syntax or rule corresponding to the type of the data; and a determiner configured to determine that the manufacturing system has an abnormality if the data included in the payload does not follow the syntax or rule corresponding to the type of the data.

19 Claims, 24 Drawing Sheets

FIG.3

| 0 1 2 3 | 4 5 6 7 | 8 9 10 11 12 13 14 15 | 16 17 18 19 20 21 22 23 24 25 26 27 28 29 30 31 |
|---|---|---|---|
| VERSION | HEADER LENGTH | TYPE OF SERVICE | TOTAL LENGTH |
| IDENTIFICATION | | FLAGS | FRAGMENT OFFSET |
| TIME TO LIVE | | PROTOCOL | HEADER CHECKSUM |
| SOURCE IP ADDRESS | | | |
| DESTINATION IP ADDRESS | | | |
| OPTIONS | | | PADDING |
| PAYLOAD | | | |

} IP HEADER

FIG.4

| 0 1 2 3 4 5 6 7 8 9 10 11 12 13 14 15 | 16 17 18 19 20 21 22 23 24 25 26 27 28 29 30 31 |
|---|---|
| SOURCE PORT NUMBER | DESTINATION PORT NUMBER |
| SEQUENCE NUMBER | |
| ACKNOWLEDGMENT NUMBER | |
| DATA OFFSET / RESERVED / CONTROL FLAGS | WINDOW SIZE |
| CHECKSUM | URGENT POINTER |
| OPTIONS | PADDING |
| PAYLOAD | |

} TCP HEADER

FIG.5

| 0 1 2 3 4 5 6 7 8 9 10 11 12 13 14 15 | 16 17 18 19 20 21 22 23 24 25 26 27 28 29 30 31 |
|---|---|
| SOURCE PORT NUMBER | DESTINATION PORT NUMBER |
| SEQUENCE NUMBER | CHECKSUM |
| PAYLOAD | |

} UDP HEADER

|   | SOURCE IP ADDRESS | SOURCE PORT NUMBER | DESTINATION IP ADDRESS | DESTINATION PORT NUMBER | CONTENTS OF PAYLOAD |
|---|---|---|---|---|---|
| A | 192.168.10.1 | ARBITRARY | 192.168.10.10 | 10000 | CONTROL COMMAND |
| B | 192.168.10.10 | 20000 | 192.168.10.1 | ARBITRARY | OPERATION RESULT NOTICE |
| C | 192.168.10.1 | ARBITRARY | 192.168.10.11 | 10000 | CONTROL COMMAND |
| D | 192.168.10.11 | 20000 | 192.168.10.1 | ARBITRARY | OPERATION RESULT NOTICE |

| 0 1 2 3 4 5 6 7 8 9 10 11 12 13 14 15 | 16 17 18 19 20 21 22 23 24 25 26 27 28 29 30 31 |
|---|---|
| CONTROL COMMAND NUMBER | CONTROL PARAMETER |

FIG.9

| CONTROL COMMAND NUMBER | MEANING | CONTROL PARAMETER |
|---|---|---|
| 0 | PARTS STATE CONFIRMATION | 0: BOARD CARRIER LANE<br>1: MOUNTING HEAD<br>2: MOUNTING NOZZLE<br>3: PARTS FEEDER |
| 1 | BOARD CARRYING-IN | 0: STOP BOARD CARRYING-IN<br>1: CONDUCT BOARD CARRYING-IN |
| 2 | BOARD MOUNTING | 0: STOP BOARD MOUNTING<br>1: CONDUCT BOARD MOUNTING |
| 3 | BOARD CARRYING-OUT | 0: STOP BOARD CARRYING-OUT<br>1: CONDUCT BOARD CARRYING-OUT |

| OPERATION RESULT NOTICE NUMBER | OPERATION RESULT INFORMATION |
|---|---|
| BOARD NUMBER ||

FIG.11

| OPERATION RESULT NOTICE NUMBER | MEANING | OPERATION RESULT INFORMATION |
|---|---|---|
| 0 | NUMBER OF MOUNTING ERRORS PER PCE | BITS 20-19: SITE    0: BOARD CARRIER LANE<br>                       1: MOUNTING HEAD<br>                       2: MOUNTING NOZZLE<br>                       3: PARTS FEEDER<br>BITS 31-21: NUMBER OF ERRORS 0-1023 (TIMES) |
| 1 | BOARD CARRYING-IN TIME | BITS 31-21: BOARD CARRYING-IN TIME 0-1023 (SEC) |
| 2 | BOARD MOUNTING TIME | BITS 31-21: BOARD MOUNTING TIME 0-1023 (SEC) |
| 3 | BOARD CARRYING-OUT TIME | BITS 31-21: BOARD CARRYING-OUT TIME 0-1023 (SEC) |
| 4 | PARTS STATE INFORMATION | BIT 16: BOARD CARRIER LANE (0: NORMAL, 1: ABNORMAL)<br>BIT 17: MOUNTING HEAD (0: NORMAL, 1: ABNORMAL)<br>BIT 18: MOUNTING NOZZLE (0: NORMAL, 1: ABNORMAL)<br>BIT 19: PARTS FEEDER (0: NORMAL, 1: ABNORMAL) |
| 5 | EQUIPMENT STATE INFORMATION | BITS 31-29    0: STANDBY<br>                1: BOARD CARRYING-IN<br>                2: BOARD MOUNTING<br>                3: BOARD CARRYING-OUT<br>                4: PARTS STATE CONFIRMATION<br>                5: MOUNTING ERROR |

FIG.15

| ORDER | CONTROL COMMAND NUMBER | CONTROL COMMAND |
|---|---|---|
| 1 | 1 | BOARD CARRYING-IN |
| 2 | 2 | BOARD MOUNTING |
| 3 | 3 | BOARD CARRYING-OUT |
| 4 | 1 | BOARD CARRYING-IN |
| 5 | 2 | BOARD MOUNTING |
| 6 | 3 | BOARD CARRYING-OUT |
| 7 | 1 | BOARD CARRYING-IN |
| ... | ... | ... |

FIG.16

| ORDER | CONTROL COMMAND NUMBER | CONTROL COMMAND |
|---|---|---|
| 1 | 1 | BOARD CARRYING-IN |
| 2 | 2 | BOARD MOUNTING |
| 3 | 1 | BOARD CARRYING-IN |
| 4 | 1 | BOARD CARRYING-IN |
| 5 | 2 | BOARD MOUNTING |
| 6 | 3 | BOARD CARRYING-OUT |
| 7 | 1 | BOARD CARRYING-IN |
| ... | ... | ... |

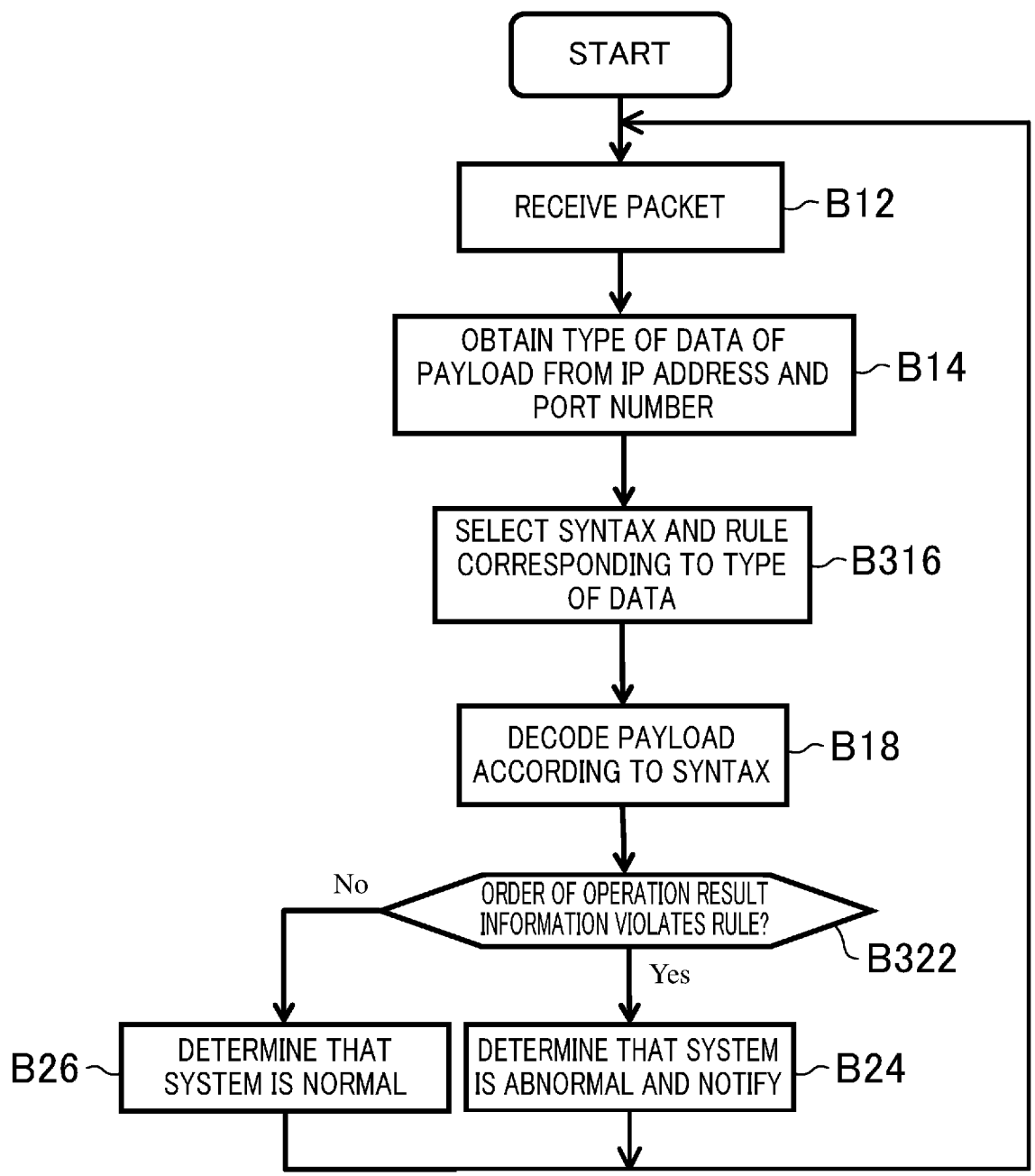

FIG.18

| ORDER | OPERATION RESULT NOTICE NUMBER | OPERATION RESULT INFORMATION |
|---|---|---|
| 1 | 1 | BOARD CARRYING-IN TIME |
| 2 | 2 | BOARD MOUNTING TIME |
| 3 | 3 | BOARD CARRYING-OUT TIME |
| 4 | 1 | BOARD CARRYING-IN TIME |
| 5 | 2 | BOARD MOUNTING TIME |
| 6 | 3 | BOARD CARRYING-OUT TIME |
| 7 | 1 | BOARD CARRYING-IN TIME |
| ... | ... | ... |

FIG.19

| ORDER | OPERATION RESULT NOTICE NUMBER | OPERATION RESULT INFORMATION |
|---|---|---|
| 1 | 1 | BOARD CARRYING-IN TIME |
| 2 | 2 | BOARD MOUNTING TIME |
| 3 | 1 | BOARD CARRYING-IN TIME |
| 4 | 1 | BOARD CARRYING-IN TIME |
| 5 | 2 | BOARD MOUNTING TIME |
| 6 | 3 | BOARD CARRYING-OUT TIME |
| 7 | 1 | BOARD CARRYING-IN TIME |
| ... | ... | ... |

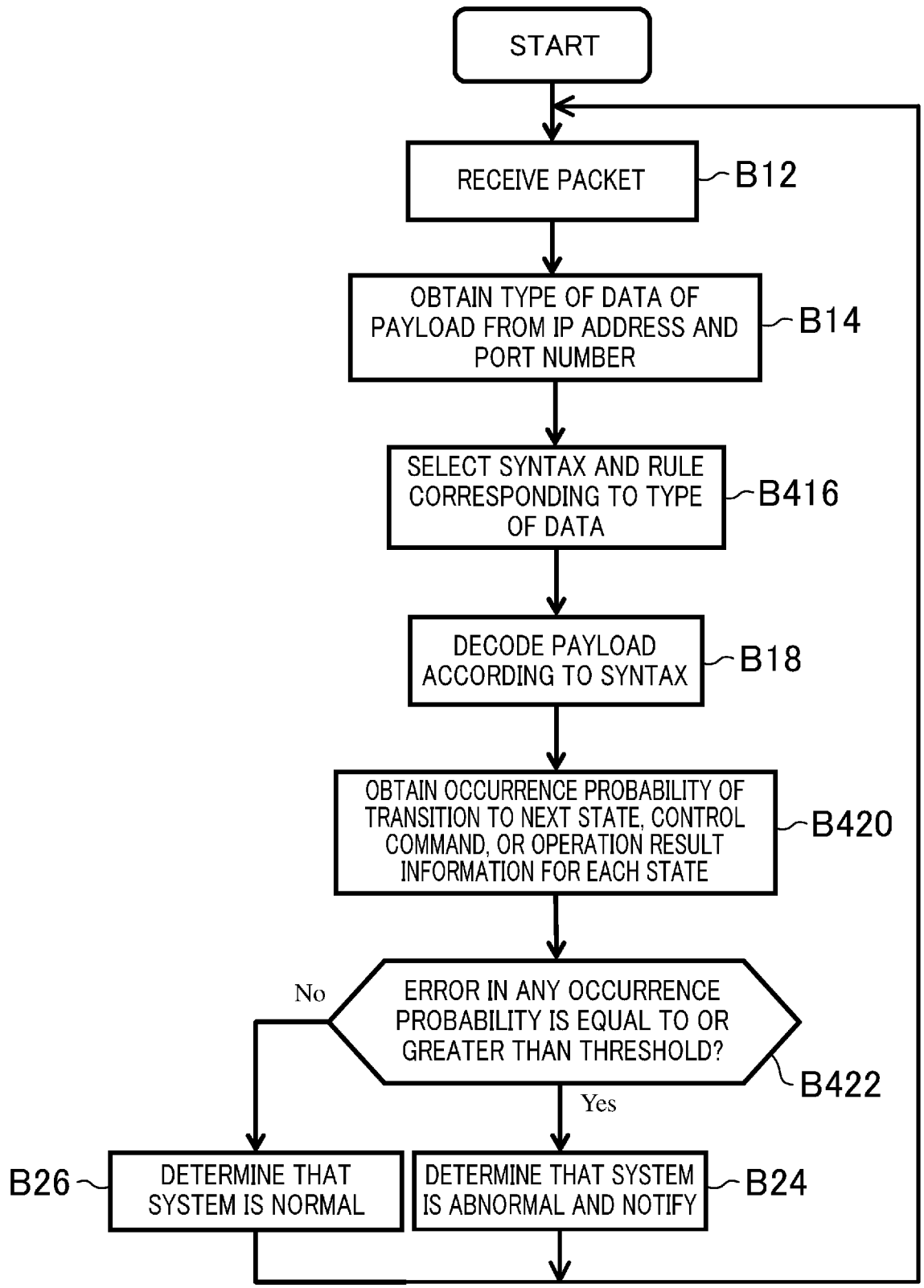

FIG.22

| TRANSITION SOURCE | TRANSITION DESTINATION | TRANSITION PROBABILITY | CONTROL COMMAND CAUSING TRANSITION | OPERATION RESULT INFORMATION OUTPUT AT TRANSITION |
|---|---|---|---|---|
| STANDBY | BOARD CARRYING-IN | 100% | BOARD CARRYING-IN | EQUIPMENT STATE INFORMATION |
| BOARD CARRYING-IN | BOARD MOUNTING | 90% | BOARD MOUNTING | BOARD CARRYING-IN TIME EQUIPMENT STATE INFORMATION |
| BOARD CARRYING-IN | PARTS STATE CONFIRMATION | 10% | PARTS STATE CONFIRMATION | EQUIPMENT STATE INFORMATION |
| BOARD MOUNTING | BOARD CARRYING-OUT | 85% | BOARD CARRYING-OUT | BOARD MOUNTING TIME EQUIPMENT STATE INFORMATION |
| BOARD MOUNTING | PARTS STATE CONFIRMATION | 10% | PARTS STATE CONFIRMATION | EQUIPMENT STATE INFORMATION |
| BOARD MOUNTING | MOUNTING ERROR | 5% | — | EQUIPMENT STATE INFORMATION |
| BOARD CARRYING-OUT | STANDBY | 90% | BOARD CARRYING-OUT | BOARD CARRYING-OUT TIME NUMBER OF MOUNTING ERRORS PER PCE EQUIPMENT STATE INFORMATION |
| BOARD CARRYING-OUT | PARTS STATE CONFIRMATION | 10% | PARTS STATE CONFIRMATION | EQUIPMENT STATE INFORMATION |
| PARTS STATE CONFIRMATION | BOARD CARRYING-IN | 33% | — | PARTS STATE INFORMATION EQUIPMENT STATE INFORMATION |
| PARTS STATE CONFIRMATION | BOARD MOUNTING | 33% | — | PARTS STATE INFORMATION EQUIPMENT STATE INFORMATION |
| PARTS STATE CONFIRMATION | BOARD CARRYING-OUT | 33% | — | PARTS STATE INFORMATION EQUIPMENT STATE INFORMATION |

FIG.23

| TRANSITION SOURCE | TRANSITION DESTINATION | OCCURRENCE PROBABILITY | CONTROL COMMAND CAUSING TRANSITION |
|---|---|---|---|
| STANDBY | BOARD CARRYING-IN | 80% | BOARD CARRYING-IN |
| BOARD CARRYING-IN | BOARD MOUNTING | 90% | BOARD MOUNTING |
| BOARD CARRYING-IN | PARTS STATE CONFIRMATION | 10% | PARTS STATE CONFIRMATION |
| BOARD MOUNTING | BOARD CARRYING-OUT | 85% | BOARD CARRYING-OUT |
| BOARD MOUNTING | PARTS STATE CONFIRMATION | 10% | PARTS STATE CONFIRMATION |
| BOARD MOUNTING | MOUNTING ERROR | 5% | — |
| BOARD CARRYING-OUT | STANDBY | 90% | BOARD CARRYING-OUT |
| BOARD CARRYING-OUT | PARTS STATE CONFIRMATION | 10% | PARTS STATE CONFIRMATION |
| PARTS STATE CONFIRMATION | BOARD CARRYING-IN | 33% | — |
| PARTS STATE CONFIRMATION | BOARD MOUNTING | 33% | — |
| PARTS STATE CONFIRMATION | BOARD CARRYING-OUT | 33% | — |

FIG.24

| TRANSITION SOURCE | TRANSITION DESTINATION | OCCURRENCE PROBABILITY | OPERATION RESULT INFORMATION OUTPUT AT TRANSITION |
|---|---|---|---|
| STANDBY | BOARD CARRYING-IN | 50% | EQUIPMENT STATE INFORMATION |
| BOARD CARRYING-IN | BOARD MOUNTING | 90% | BOARD CARRYING-IN TIME EQUIPMENT STATE INFORMATION |
| BOARD CARRYING-IN | PARTS STATE CONFIRMATION | 10% | EQUIPMENT STATE INFORMATION |
| BOARD MOUNTING | BOARD CARRYING-OUT | 85% | BOARD MOUNTING TIME EQUIPMENT STATE INFORMATION |
| BOARD MOUNTING | PARTS STATE CONFIRMATION | 10% | EQUIPMENT STATE INFORMATION |
| BOARD MOUNTING | MOUNTING ERROR | 5% | EQUIPMENT STATE INFORMATION |
| BOARD CARRYING-OUT | STANDBY | 90% | BOARD CARRYING-OUT TIME NUMBER OF MOUNTING ERRORS PER PCE EQUIPMENT STATE INFORMATION |
| BOARD CARRYING-OUT | PARTS STATE CONFIRMATION | 10% | EQUIPMENT STATE INFORMATION |
| PARTS STATE CONFIRMATION | BOARD CARRYING-IN | 33% | PARTS STATE INFORMATION EQUIPMENT STATE INFORMATION |
| PARTS STATE CONFIRMATION | BOARD MOUNTING | 33% | PARTS STATE INFORMATION EQUIPMENT STATE INFORMATION |
| PARTS STATE CONFIRMATION | BOARD CARRYING-OUT | 33% | PARTS STATE INFORMATION EQUIPMENT STATE INFORMATION |

FIG.25

| TRANSITION SOURCE | TRANSITION DESTINATION | OCCURRENCE PROBABILITY |
|---|---|---|
| STANDBY | BOARD CARRYING-IN | 80% |
| BOARD CARRYING-IN | BOARD MOUNTING | 90% |
| BOARD CARRYING-IN | PARTS STATE CONFIRMATION | 10% |
| BOARD MOUNTING | BOARD CARRYING-OUT | 85% |
| BOARD MOUNTING | PARTS STATE CONFIRMATION | 10% |
| BOARD MOUNTING | MOUNTING ERROR | 5% |
| BOARD CARRYING-OUT | STANDBY | 90% |
| BOARD CARRYING-OUT | PARTS STATE CONFIRMATION | 10% |
| PARTS STATE CONFIRMATION | BOARD CARRYING-IN | 33% |
| PARTS STATE CONFIRMATION | BOARD MOUNTING | 33% |
| PARTS STATE CONFIRMATION | BOARD CARRYING-OUT | 33% |

FIG.26

| COMMAND | NEXT COMMAND | PROBABILITY (%) |
|---|---|---|
| BOARD CARRYING-IN | BOARD MOUNTING | 90 |
| | PARTS STATE CONFIRMATION | 10 |
| BOARD MOUNTING | BOARD CARRYING-OUT | 85 |
| | PARTS STATE CONFIRMATION | 10 |
| BOARD CARRYING-OUT | BOARD CARRYING-IN | 90 |
| | PARTS STATE CONFIRMATION | 10 |
| PARTS STATE CONFIRMATION | BOARD MOUNTING | 30 |
| | BOARD CARRYING-OUT | 30 |
| | BOARD CARRYING-IN | 30 |
| | PARTS STATE CONFIRMATION | 10 |

FIG.27

| INFORMATION | NEXT INFORMATION | PROBABILITY (%) |
|---|---|---|
| BOARD CARRYING-IN TIME | BOARD MOUNTING TIME | 85 |
| | PARTS STATE INFORMATION | 10 |
| BOARD MOUNTING TIME | BOARD CARRYING-OUT TIME | 90 |
| | PARTS STATE INFORMATION | 10 |
| BOARD CARRYING-OUT TIME | BOARD CARRYING-IN TIME | 90 |
| | PARTS STATE INFORMATION | 10 |
| PARTS CONFIRMATION | BOARD MOUNTING TIME | 30 |
| | BOARD CARRYING-OUT TIME | 30 |
| | BOARD CARRYING-IN TIME | 30 |
| | PARTS STATE INFORMATION | 10 |

FIG.30

| TRANSITION SOURCE | TRANSITION DESTINATION | TIME | CONTROL COMMAND CAUSING TRANSITION | OPERATION RESULT INFORMATION OUTPUT AT TRANSITION |
|---|---|---|---|---|
| STANDBY | BOARD CARRYING-IN | — | BOARD CARRYING-IN | EQUIPMENT STATE INFORMATION |
| BOARD CARRYING-IN | BOARD MOUNTING | 10 SECS | BOARD MOUNTING | BOARD CARRYING-IN TIME EQUIPMENT STATE INFORMATION |
| BOARD CARRYING-IN | PARTS STATE CONFIRMATION | 1 SEC | PARTS STATE CONFIRMATION | EQUIPMENT STATE INFORMATION |
| BOARD MOUNTING | BOARD CARRYING-OUT | 10 SECS | BOARD CARRYING-OUT | BOARD MOUNTING TIME EQUIPMENT STATE INFORMATION |
| BOARD MOUNTING | PARTS STATE CONFIRMATION | 1 SEC | PARTS STATE CONFIRMATION | EQUIPMENT STATE INFORMATION |
| BOARD MOUNTING | MOUNTING ERROR | 1 SEC | — | EQUIPMENT STATE INFORMATION |
| BOARD CARRYING-OUT | STANDBY | 10 SECS | BOARD CARRYING-OUT | BOARD CARRYING-OUT TIME NUMBER OF MOUNTING ERRORS PER PCE EQUIPMENT STATE INFORMATION |
| BOARD CARRYING-OUT | PARTS STATE CONFIRMATION | 1 SEC | PARTS STATE CONFIRMATION | EQUIPMENT STATE INFORMATION |
| PARTS STATE CONFIRMATION | BOARD CARRYING-IN | 1 SEC | — | PARTS STATE INFORMATION EQUIPMENT STATE INFORMATION |
| PARTS STATE CONFIRMATION | BOARD MOUNTING | 1 SEC | — | PARTS STATE INFORMATION EQUIPMENT STATE INFORMATION |
| PARTS STATE CONFIRMATION | BOARD CARRYING-OUT | 1 SEC | — | PARTS STATE INFORMATION EQUIPMENT STATE INFORMATION |

FIG.31

| TRANSITION SOURCE | TRANSITION DESTINATION | TIME | CONTROL COMMAND CAUSING TRANSITION |
|---|---|---|---|
| STANDBY | BOARD CARRYING-IN | — | BOARD CARRYING-IN |
| BOARD CARRYING-IN | BOARD MOUNTING | 10 SECS | BOARD MOUNTING |
| BOARD CARRYING-IN | PARTS STATE CONFIRMATION | 1 SEC | PARTS STATE CONFIRMATION |
| BOARD MOUNTING | BOARD CARRYING-OUT | 100 SECS | BOARD CARRYING-OUT |
| BOARD MOUNTING | PARTS STATE CONFIRMATION | 1 SEC | PARTS STATE CONFIRMATION |
| BOARD MOUNTING | MOUNTING ERROR | 1 SEC | — |
| BOARD CARRYING-OUT | STANDBY | 10 SECS | BOARD CARRYING-OUT |
| BOARD CARRYING-OUT | PARTS STATE CONFIRMATION | 1 SEC | PARTS STATE CONFIRMATION |
| PARTS STATE CONFIRMATION | BOARD CARRYING-IN | 1 SEC | — |
| PARTS STATE CONFIRMATION | BOARD MOUNTING | 1 SEC | — |
| PARTS STATE CONFIRMATION | BOARD CARRYING-OUT | 1 SEC | — |

FIG.32

| TRANSITION SOURCE | TRANSITION DESTINATION | TIME | OPERATION RESULT INFORMATION OUTPUT AT TRANSITION |
|---|---|---|---|
| STANDBY | BOARD CARRYING-IN | — | EQUIPMENT STATE INFORMATION |
| BOARD CARRYING-IN | BOARD MOUNTING | 10 SECS | BOARD CARRYING-IN TIME EQUIPMENT STATE INFORMATION |
| BOARD CARRYING-IN | PARTS STATE CONFIRMATION | 1 SEC | EQUIPMENT STATE INFORMATION |
| BOARD MOUNTING | BOARD CARRYING-OUT | 100 SECS | BOARD MOUNTING TIME EQUIPMENT STATE INFORMATION |
| BOARD MOUNTING | PARTS STATE CONFIRMATION | 1 SEC | EQUIPMENT STATE INFORMATION |
| BOARD MOUNTING | MOUNTING ERROR | 1 SEC | EQUIPMENT STATE INFORMATION |
| BOARD CARRYING-OUT | STANDBY | 10 SECS | BOARD CARRYING-OUT TIME NUMBER OF MOUNTING ERRORS PER PCE EQUIPMENT STATE INFORMATION |
| BOARD CARRYING-OUT | PARTS STATE CONFIRMATION | 1 SEC | EQUIPMENT STATE INFORMATION |
| PARTS STATE CONFIRMATION | BOARD CARRYING-IN | 1 SEC | PARTS STATE INFORMATION EQUIPMENT STATE INFORMATION |
| PARTS STATE CONFIRMATION | BOARD MOUNTING | 1 SEC | PARTS STATE INFORMATION EQUIPMENT STATE INFORMATION |
| PARTS STATE CONFIRMATION | BOARD CARRYING-OUT | 1 SEC | PARTS STATE INFORMATION EQUIPMENT STATE INFORMATION |

FIG.33

| TRANSITION SOURCE | TRANSITION DESTINATION | TIME |
|---|---|---|
| STANDBY | BOARD CARRYING-IN | — |
| BOARD CARRYING-IN | BOARD MOUNTING | 10 SECS |
| BOARD CARRYING-IN | PARTS STATE CONFIRMATION | 1 SEC |
| BOARD MOUNTING | BOARD CARRYING-OUT | 100 SECS |
| BOARD MOUNTING | PARTS STATE CONFIRMATION | 1 SEC |
| BOARD MOUNTING | MOUNTING ERROR | 1 SEC |
| BOARD CARRYING-OUT | STANDBY | 10 SECS |
| BOARD CARRYING-OUT | PARTS STATE CONFIRMATION | 1 SEC |
| PARTS STATE CONFIRMATION | BOARD CARRYING-IN | 1 SEC |
| PARTS STATE CONFIRMATION | BOARD MOUNTING | 1 SEC |
| PARTS STATE CONFIRMATION | BOARD CARRYING-OUT | 1 SEC |

FIG.34

| COMMAND | NEXT COMMAND | TIME (SEC) |
|---|---|---|
| BOARD CARRYING-IN | BOARD MOUNTING | 10 |
| | PARTS STATE CONFIRMATION | 1 |
| BOARD MOUNTING | BOARD CARRYING-OUT | 10 |
| | PARTS STATE CONFIRMATION | 1 |
| BOARD CARRYING-OUT | BOARD CARRYING-IN | 10 |
| | PARTS STATE CONFIRMATION | 1 |
| PARTS STATE CONFIRMATION | BOARD MOUNTING | 11 |
| | BOARD CARRYING-OUT | 11 |
| | BOARD CARRYING-IN | 11 |
| | PARTS STATE CONFIRMATION | 2 |

FIG.35

| INFORMATION | NEXT INFORMATION | TIME (SEC) |
|---|---|---|
| BOARD CARRYING-IN TIME | BOARD MOUNTING TIME | 10 |
| | PARTS STATE INFORMATION | 1 |
| BOARD MOUNTING TIME | BOARD CARRYING-OUT TIME | 10 |
| | PARTS STATE INFORMATION | 1 |
| BOARD CARRYING-OUT TIME | BOARD CARRYING-IN TIME | 10 |
| | PARTS STATE INFORMATION | 1 |
| PARTS CONFIRMATION | BOARD MOUNTING TIME | 11 |
| | BOARD CARRYING-OUT TIME | 11 |
| | BOARD CARRYING-IN TIME | 11 |
| | PARTS STATE INFORMATION | 2 |

DATA ANALYSIS DEVICE, METHOD, AND STORAGE MEDIUM

CROSS-REFERENCE TO RELATED APPLICATIONS

This is a continuation of International Application No. PCT/JP2018/012306 filed on Mar. 27, 2018, which claims priority to Japanese Patent Application No. 2017-061210 filed on Mar. 27, 2017. The entire disclosures of these applications are incorporated by reference herein.

BACKGROUND

The present disclosure relates to a technology of analyzing data on a computer network, and more particularly to a technology of analyzing data in a manufacturing system.

In recent years, efforts have been made actively toward improving the productivity, creating unprecedented values, and developing new business models by cooperating with things and services inside and outside of factories via communication networks such as the Internet.

In the Internet space, on the other hand, cyberattacks by hacking, malware, etc., have become active. Cases such as unauthorized invasion and information leakage by cyberattacks are increasing year by year. In manufacturing systems in factories, also, cases of halt in production and destruction of facilities have been reported. It is therefore required to detect abnormalities occurring in manufacturing systems having computer networks thereby improving the security level of the manufacturing systems.

For example, Japanese Unexamined Patent Publication No. 2012-168755 (Patent Document 1) describes an example of a mechanism for improving the security level for a control system. The system in Patent Document 1 counts abnormality notices sent from monitoring sections corresponding to a plurality of control systems and evaluates reputation of a control system suspected of abnormality. If an abnormality is recognized in the light of the standard from the evaluation results, outbound traffic from at least the protection region in which the abnormality-suspected control system is operating is restricted.

Also, in a manufacturing system in a factory, manufacturing devices are connected via a network to perform manufacturing while communicating with each other. If a manufacturing device connected to such a network is taken over by unauthorized manipulation, etc. or data traveling over the network is tampered, problems such as manufacture of defective products and destruction of the manufacturing device may occur. To address these problems, Japanese Unexamined Patent Publication No. 2016-19028 (Patent Document 2), for example, describes an attack detection device that detects an unauthorized conduct from data on a network.

SUMMARY

In order to introduce a mechanism for detecting abnormalities like one described in Patent Document 1, the existing manufacturing systems need to be extensively changed.

The attack detection device of Patent Document 2 detects an attack only from information in a window stored in a header of a packet used for communication, and therefore is not necessarily capable of performing highly precise attack detection. Also, from such information in a window stored in a header of a packet, it is unable to detect, as an abnormality, occurrence of a failure in a manufacturing system.

An objective of the present disclosure is detecting an abnormality in a manufacturing system without making extensive modification to the existing manufacturing systems.

The data analysis device according to the present disclosure is a data analysis device that analyzes data transmitted in a manufacturing system having a manufacturing device and a manufacture control device that controls the manufacturing device, and includes: a receiver configured to receive a first packet transmitted between the manufacture control device and the manufacturing device; an analyzer configured to obtain the type of data included in a payload of the received first packet from an IP address and a port number included in a header of the first packet; a selector configured to select, based on the type of the data obtained by the analyzer, a syntax or rule corresponding to the type of the data; and a determiner configured to determine that the manufacturing system has an abnormality if the data included in the payload does not follow the syntax or rule corresponding to the type of the data.

According to the above configuration, it is possible to receive a packet transmitted between the manufacture control device and the manufacturing device in the manufacturing system and determine that the manufacturing system has an abnormality from the contents of the packet. Since the received packet is a packet normally used in the manufacturing system irrelevantly to the data analysis device, an abnormality in the manufacturing system can be easily found.

The data analysis method according to the present disclosure is a data analysis method of analyzing data transmitted in a manufacturing system having a manufacturing device and a manufacture control device that controls the manufacturing device, and includes: receiving a packet transmitted between the manufacture control device and the manufacturing device; obtaining the type of data included in a payload of the received packet from an IP address and a port number included in a header of the packet; selecting, based on the type of the obtained data, a syntax or rule corresponding to the type of the data; and determining that the manufacturing system has an abnormality if the data included in the payload does not follow the syntax or rule corresponding to the type of the data.

The non-transitory computer-readable storage medium according to the present disclosure stores instructions that, when executed by a computer system, cause the computer system to perform a data analysis method of analyzing data transmitted in a manufacturing system having a manufacturing device and a manufacture control device that controls the manufacturing device. The data analysis method includes: receiving a packet transmitted between the manufacture control device and the manufacturing device; obtaining the type of data included in a payload of the received packet from an IP address and a port number included in a header of the packet; selecting, based on the type of the obtained data, a syntax or rule corresponding to the type of the data; and determining that the manufacturing system has an abnormality if the data included in the payload does not follow the syntax or rule corresponding to the type of the data.

According to the present disclosure, it is possible to detect an abnormality in a manufacturing system without making extensive modification to the existing manufacturing systems. Therefore, an attack from outside the manufacturing system, a failure inside the manufacturing system, etc. can be detected at low cost.

BRIEF DESCRIPTION OF THE DRAWINGS

FIG. 3 is a view showing an example of the format of an IP packet.
FIG. 4 is a view showing an example of the format of a TCP packet.
FIG. 5 is a view showing an example of the format of a UDP packet.
FIG. 9 is a view showing an example of the syntax of the control command.
FIG. 10 is a view showing an example of the format of an operation result notice.
FIG. 11 is a view showing an example of the syntax of the operation result notice.
FIG. 15 is a view showing an example of the order of control commands in a normal state.
FIG. 16 is a view showing an example of the order of control commands in an abnormal state.
FIG. 17 is a flowchart showing another alteration of the flowchart of FIG. 13.
FIG. 18 is a view showing an example of the order of operation result information in a normal state.
FIG. 19 is a view showing an example of the order of operation result information in an abnormal state.
FIG. 20 is a flowchart showing yet another alteration of the flowchart of FIG. 13,
FIG. 22 is a view showing an example of rule regarding the probabilities of state transitions of the manufacturing device in a normal state.
FIG. 23 is a view showing an example of information regarding the actual occurrence probabilities of control commands in an abnormal state.
FIG. 24 is a view showing an example of information regarding the actual occurrence probabilities of operation result information in an abnormal state.
FIG. 25 is a view showing an example of information regarding the actual occurrence probabilities of state transitions of the manufacturing device in an abnormal state.
FIG. 26 is a view showing an example of rule regarding the occurrence probabilities of next commands in a normal state.

FIG. 27 is a view showing an example of rule regarding the occurrence probabilities of next operation result information in a normal state.
FIG. 30 is a view showing an example of rule regarding the times required for state transitions of the manufacturing device in a normal state.
FIG. 31 is a view showing an example of information regarding the actual times until the outputs of control commands in an abnormal state.
FIG. 32 is a view showing an example of information regarding the actual times until the outputs of operation result information in an abnormal state.
FIG. 33 is a view showing an example of information regarding the actual times required for state transitions of the manufacturing device in an abnormal state.
FIG. 34 is a view showing an example of rule regarding the times until the outputs of next commands in a normal state.
FIG. 35 is a view showing an example of rule regarding the times until the outputs of next operation result information in a normal state.

DETAILED DESCRIPTION

Figure 1:
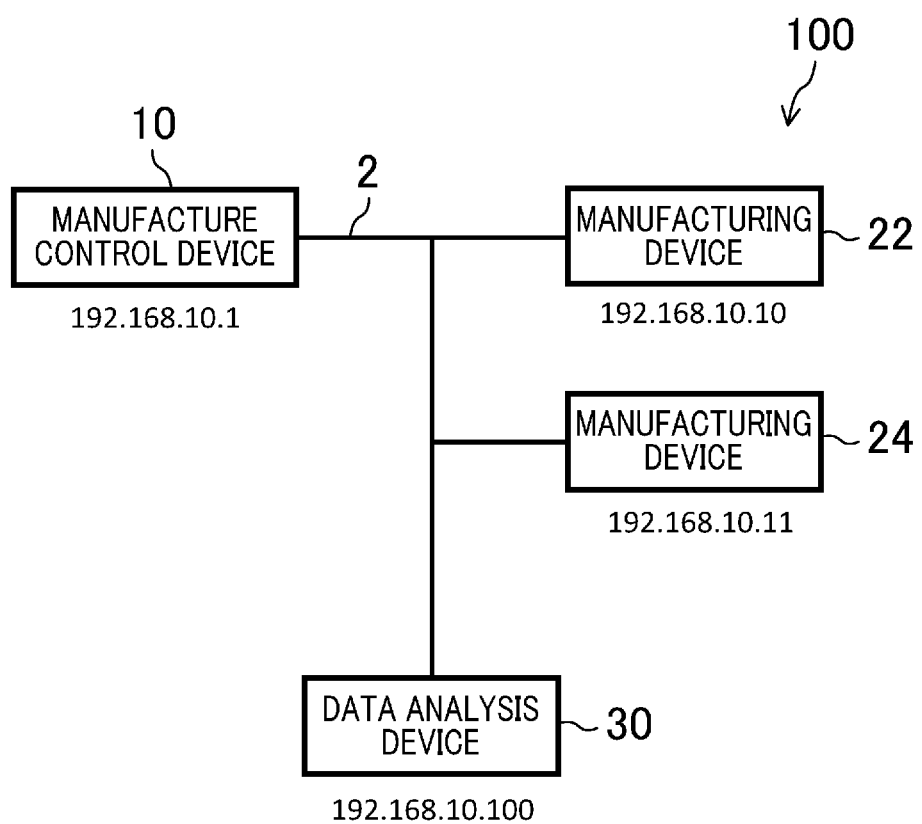
FIG. 1 is a block diagram showing a configuration example of a manufacturing system including a data analysis device according to an embodiment of the present invention.

An embodiment of the present invention will be described hereinafter with reference to the accompanying drawings, in which components denoted by the same reference numerals refer to the same or like components.
FIG. 1 is a block diagram showing a configuration example of a manufacturing system including a data analysis device according to an embodiment of the present invention. A manufacturing system 100 of FIG. 1 includes a network 2, a manufacture control device 10, manufacturing devices 22 and 24, and a data analysis device 30. The manufacture control device 10, the manufacturing devices 22 and 24, and the data analysis device 30 are connected to one another via the network 2.
The manufacture control device 10 controls the entire manufacturing system 100. The manufacture control device 10 sends control commands and data for manufacture, for example, to the manufacturing devices 22 and 24, and the manufacturing devices 22 and 24 send their own states, for example, to the manufacture control device 10 as operation result information. Each of the manufacturing devices 22 and 24 is a device that performs at least one process for manufacturing a product. The manufacturing system 100 may have more manufacturing devices or have only one manufacturing device.
The network 2 may be a local area network (LAN), for example, and may be a wired or wireless network. The network 2 may be connected to the Internet. The data analysis device 30 is connected to the network 2 so that it can receive data traveling over the network 2, especially data sent/received between the manufacture control device 10 and the manufacturing device 22 or 24. For example, the network 2 may be configured so that any data sent/received between the manufacture control device 10, the manufacturing devices 22 and 24, and the data analysis device 30, which are components of the manufacturing system 100, can be received by any of these components. Otherwise, the data analysis device 30 may be connected to a mirror port of a router used in the network 2. In FIG. 1, the numerals appearing below the names of the components represent examples of Internet Protocol (IP) addresses allocated to the components.

Figure 2:
FIG. 2 is a view showing a configuration example of a packet that travels over a network in FIG. 1.

FIG. 2 is a view showing a configuration example of a packet (also called a frame) traveling over the network 2 in FIG. 1. FIG. 3 is a view showing an example of the format of an IP packet. The IP packet refers to the portion of the packet of FIG. 2 excluding the Ethernet (registered trademark) header. The IP header includes a source IP address and a destination IP address.

FIG. 4 is a view showing an example of the format of a transmission control protocol (TCP) packet. FIG. 5 is a view showing an example of the format of a user datagram protocol (UDP) packet. The TCP packet and the UDP packet refer to the portions of the IP packet excluding the IP header. The TCP header and the UDP header include a source port number and a destination port number.

Figures 6, 7, 8:
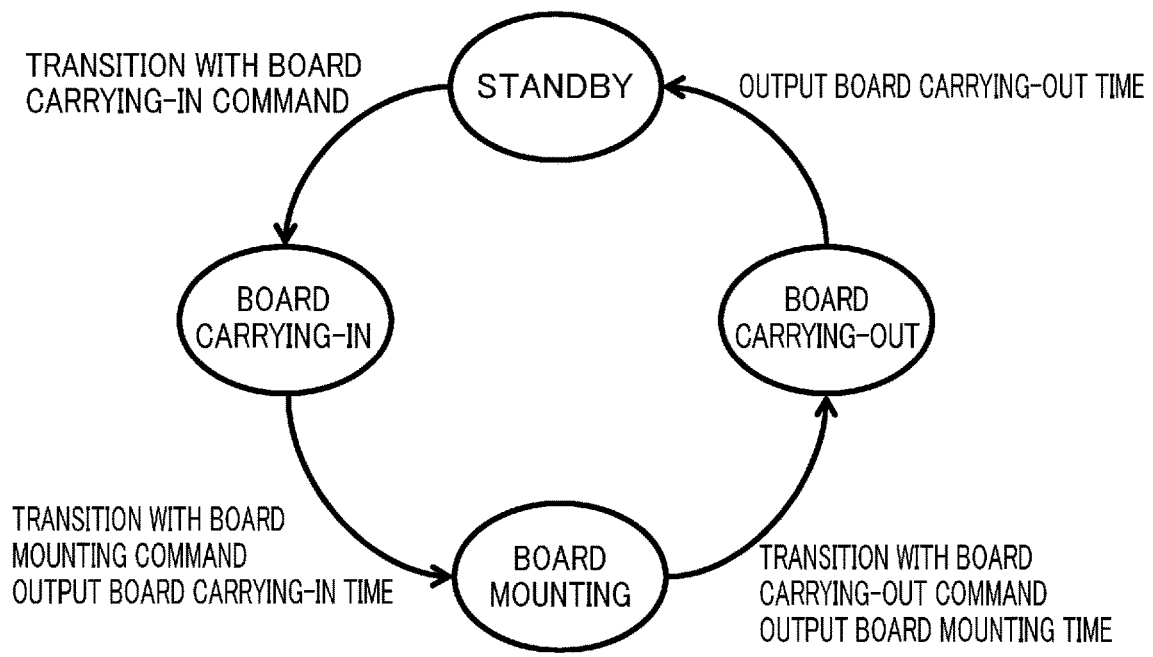
FIG. 6 is a view showing an example of the correspondence between a combination of IP addresses, etc. included in a header of a packet and the type of data included in a payload of the packet.
FIG. 7 is a state transition diagram showing an example of the state transition of a manufacturing device in FIG. 1.
FIG. 8 is a view showing an example of the format of a control command.

FIG. 6 is a view showing an example of the correspondence between a combination of the IP addresses, etc. included in the headers of the packet and the type of data included in the payload of the packet. FIG. 6 indicates, for example, that, to combination A of the source IP address of 192.168.10.1, the destination IP address of 192.168.10.10, and the destination port number of 10000, a control command corresponds as the type of data of the payload. In this case, the source port number may be any value. To explain this referring to FIG. 1, it is found that a packet from the manufacture control device 10 to the port number 10000 of the manufacturing device 22 includes a control command in its payload.

It is also indicated that, to combination B of the source IP address of 192.168.10.10, the source port number of 20000, and the destination IP address of 192.168.10.1, an operation result notice corresponds as the type of data of the payload. In this case, the destination port number may be any value. To explain this referring to FIG. 1, it is found that a packet from the port number 20000 of the manufacturing device 22 to the manufacture control device 10 includes an operation result notice in its payload.

FIG. 7 is a state transition diagram showing an example of the state transition of the manufacturing device 22 in FIG. 1. The manufacturing device 22 is herein assumed to be a device for mounting an electronic component on a printed circuit board, for example. The manufacturing device 22 receives a control command from the manufacture control device 10 by way of a packet. The state of the manufacturing device 22 transitions from a standby state to a board carrying-in state, a board mounting state, and a board carrying-out state in this order as shown in FIG. 7 in accordance with reception of a control command or termination of an operation instructed under a control command. The manufacturing device 22 sends an operation result notice to the manufacture control device 10 at the time of a transition of its state, etc. by way of a packet. The manufacturing device 24 is also configured similarly to the manufacturing device 22.

FIG. 8 is a view showing an example of the format of the control command. The control command has a control command number field and a control parameter field. FIG. 9 is a view showing an example of the syntax of the control command. As shown in FIG. 9, the control command number must be 0, 1, 2, or 3, for example. When the control command number is 0, for example, the control parameter must be 0, 1, 2, or 3. When the control command number is 1, 2, or 3, for example, the control parameter must be 0 or 1. Such a rule regarding the values the fields of the control command can take is referred to as the syntax of the control command.

The control command may have fields for storing a checksum and a message authentication code (MAC). For the checksum and the MAC, also, there is a rule regarding the values such fields can take, and such a rule is also included in the syntax of the control command.

FIG. 10 is a view showing an example of the format of the operation result notice. The operation result notice has an operation result notice number field, an operation result information field, and a board number field. FIG. 11 is a view showing an example of the syntax of the operation result notice. As shown in FIG. 11, the operation result notice number must be 0, 1, 2, 3, 4, or 5, for example. When the operation result notice number is 0, for example, the number expressed by bits 20 and 19 of the operation result information field must be 0, 1, 2, or 3, and the number expressed by bits 31 to 21 of the operation result information field must be in the range of 0 to 1023. The board number is counted up from 0 by one every time one board is produced. The counting is however reset after 32767 to 0. The board number therefore must be in the range of 0 to 32767. Such a rule regarding the values the fields of the operation result notice can take is referred to as the syntax of the operation result notice.

The control command and the operation result notice may be constituted by binary data or constituted by strings of characters such as ASCII characters. The manufacture control device 10 may encrypt the control command with an encryption key before sending, for example, and the manufacturing devices 22 and 24 and the data analysis device 30 may decrypt the encrypted control command. The manufacturing devices 22 and 24 may encrypt the operation result notice with an encryption key before sending, for example, and the manufacture control device 10 and the data analysis device 30 may decrypt the encrypted operation result notice.

Figure 12:
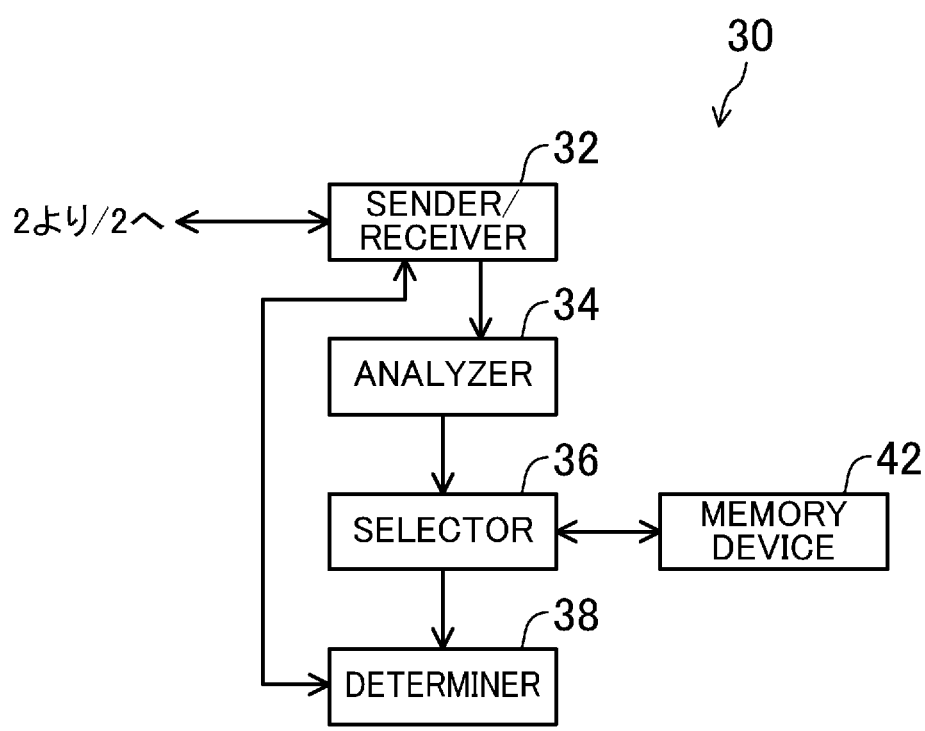
FIG. 12 is a block diagram showing a configuration example of the data analysis device in FIG. 1.

FIG. 12 is a block diagram showing a configuration example of the data analysis device 30 in FIG. 1. The data analysis device 30 has a sender/receiver 32, an analyzer 34, a selector 36, a determiner 38, and a memory device 42.

The sender/receiver 32 receives a packet transmitted between the manufacture control device 10 and the manufacturing device 22 or 24 from the network 2 and outputs the packet to the analyzer 34. In the analyzer 34, a correspondence as shown in FIG. 6 is stored in advance. Based on the correspondence of FIG. 6, for example, the analyzer 34 obtains the type of the data included in the payload of the received packet from the IP addresses and the port numbers included in the headers of the received packet, and outputs the result to the selector 36.

In the memory device 42, syntaxes or rules corresponding to the types of data, e.g., the syntax of the control command and the syntax of the operation result notice are stored in advance. The selector 36 selects and reads the syntax or rule corresponding to the type of the data obtained by the analyzer 34 from the data stored in the memory device 42.

The determiner 38 determines that the manufacturing system 100 has an abnormality if the data included in the payload does not follow the syntax or rule corresponding to the type of the data, and notifies the outside of the data analysis device 30 of the determination result. For example, the determiner 38 notifies the sender/receiver 32 of the determination result, and the sender/receiver 32 generates a packet including the determination result and sends the packet to the manufacture control device 10. As used herein, the abnormality includes, not only an abnormality caused by an attack from outside the manufacturing system 100, but also an abnormality due to a failure occurring inside the manufacturing system 100.

Figure 13:
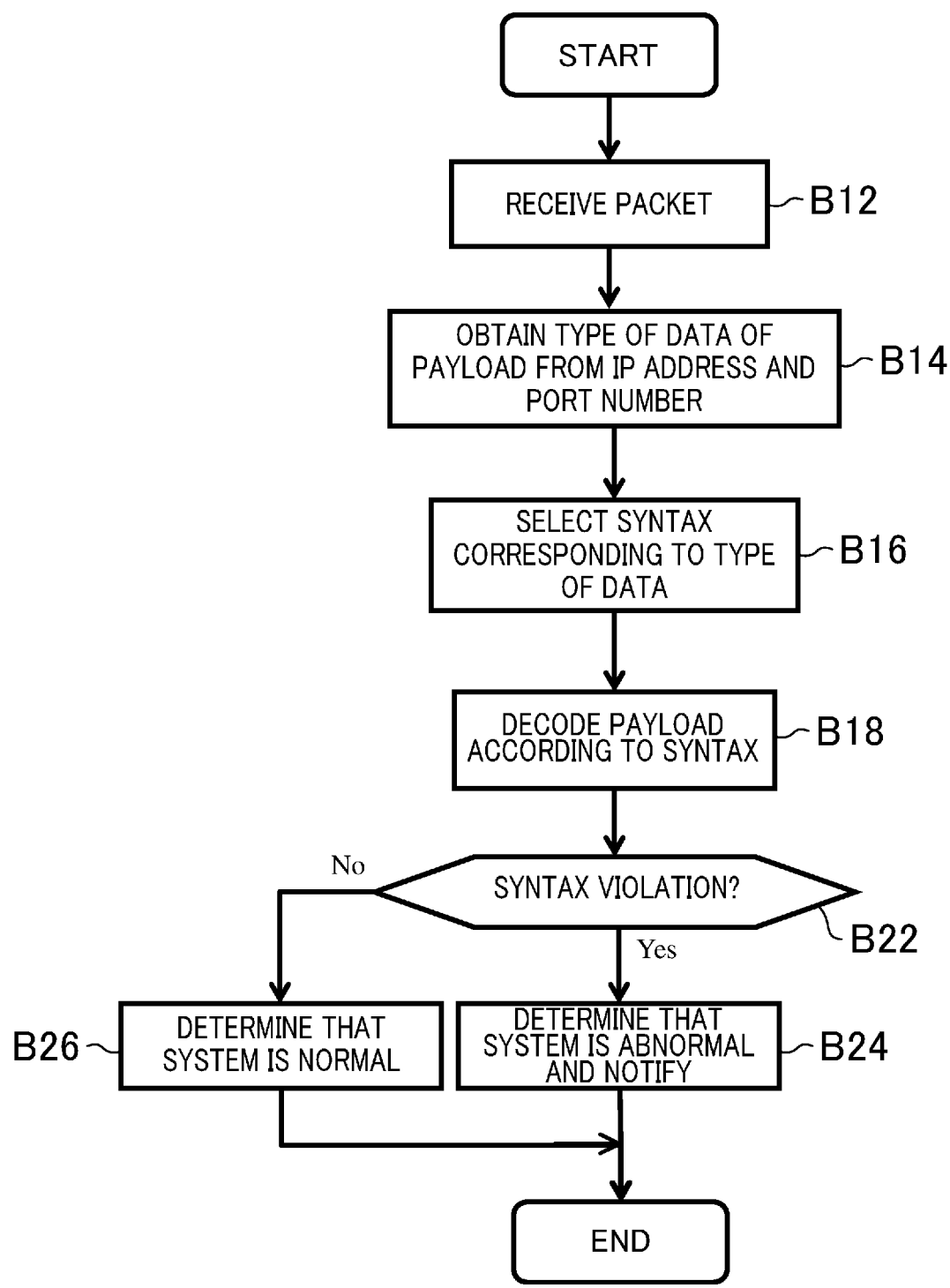
FIG. 13 is a flowchart showing an example of the operation of the data analysis device in FIG. 1.

FIG. 13 is a flowchart showing an example of the operation of the data analysis device 30 in FIG. 1. In block B12, the sender/receiver 32 in FIG. 12 receives a packet from the network 2, removes the Ethernet header from the packet, and outputs the resultant packet to the analyzer 34. In block B14, the analyzer 34 obtains the type of the data in the payload of the received packet from the IP addresses and the port numbers in the packet in accordance with the correspondence of FIG. 6 stored in advance. The analyzer 34 outputs the type to the selector 35 together with the packet. For example, when the source IP address is 192.168.10.1, the destination IP address is 192.168.10.10, and the destination port number is 10000, the analyzer 34 determines that the type of the data in the payload is a control command as shown in FIG. 8.

In block B16, the selector 36 selects and reads the syntax corresponding to the type of the data obtained by the analyzer 34 from the data stored in the memory device 42. The selector 36 outputs the read syntax to the determiner 38 together with the input packet. When the type of the data in the payload is a control command, information like one in FIGS. 8 and 9 is read as the syntax. In block B18, the determiner 38 decodes the payload of the input packet according to the syntax read by the selector 36.

In block B22, the determiner 38 determines whether or not there is a syntax violation in the data in the decoded payload. The control command has a 16-bit control command number field and a 16-bit control parameter field as shown in FIG. 8. These 16-bit fields can express integers from 0 to 65535. When the type of the data in the payload is a control command, the value in the control command number field must be an integer from 0 to 3 as shown in FIG. 9. Therefore, when the value in the control command number field is any number other than the integers 0 to 3, the determiner 38 determines that there is a syntax violation.

Also, as shown in FIG. 9, when the value in the control command number field is 0, the value in the control parameter field must be an integer from 0 to 3. When the value in the control command number field is 1, 2, or 3, the value in the control parameter field must be 0 or 1. Therefore, when the value in the control command number field is 0 and the value in the control parameter field is any number other than the integers 0 to 3, the determiner 38 determines that there is a syntax violation. Also, when the value in the control command number field is 1, 2, or 3 and the value in the control parameter field is neither 0 nor 1, the determiner 38 determines that there is a syntax violation.

The processing proceeds to block B24 if there is a syntax violation, or to block B26 if there is no syntax violation. In block B24, the determiner 38 determines that the manufacturing system 100 has an abnormality, and provides notification of the determination result. For example, the determiner 38 sends the determination result to the manufacture control device 10 via the sender/receiver 32 and the network 2. Also, the determiner 38 may make an indicator display the determination result. In block B26, the determiner 38 determines that the manufacturing system 100 is normal. Once block B24 or B26 is terminated, processing of one packet is terminated. Thereafter, the processing of FIG. 13 may be repeated.

A case where the type of the data in the payload is an operation result notice as shown in FIG. 10 will then be described. For example, when the source IP address is 192.168.10.10, the source port number is 20000, and the destination IP address is 192.168.10.1, the analyzer 34 determines that the type of the data in the payload is an operation result notice according to the correspondence of FIG. 6 in block B14. When the type of the data in the payload is an operation result notice, information like one in FIGS. 10 and 11 is read as the syntax.

The operation result notice has a 16-bit operation result notice number field, a 16-bit operation result information field, and a 32-bit board number field as shown in FIG. 10. When the type of the data in the payload is an operation result notice, the value in the operation result notice number field must be an integer from 0 to 5 as shown in FIG. 11. Therefore, when the value in the operation result notice number field is any number other than the integers 0 to 5, the determiner 38 determines that there is a syntax violation.

For each of the operation result notice numbers, the bit field values in the operation result information field must be values as shown in FIG. 11. Therefore, when the bit field values in the operation result information field are not values as shown in FIG. 11, the determiner 38 determines that there is a syntax violation in block B22. Also, when the value in the board number field is any number other than the integers of 0 to 32767, the determiner 38 determines that there is a syntax violation in block B22. Further, when the board number field has not been counted up although production of one board has been completed, there is a possibility that a board may have been stolen. The examiner 38 therefore determines that there is a syntax violation in block B22.

As described above, the data analysis device 30 of FIG. 12 can receive a packet transmitted between the manufacture control device 10 and the manufacturing device 22 or 24 in the manufacturing system 100 and determine that the manufacturing system 100 has an abnormality from the contents of the packet. Since the received packet is a packet normally used in the manufacturing system 100 irrelevantly to the data analysis device 30, it is possible to detect an abnormality in the manufacturing system without making extensive modification to the existing manufacturing systems. Therefore, an attack from outside the manufacturing system, a failure inside the manufacturing system, etc. can be detected at low cost.

Figure 14:
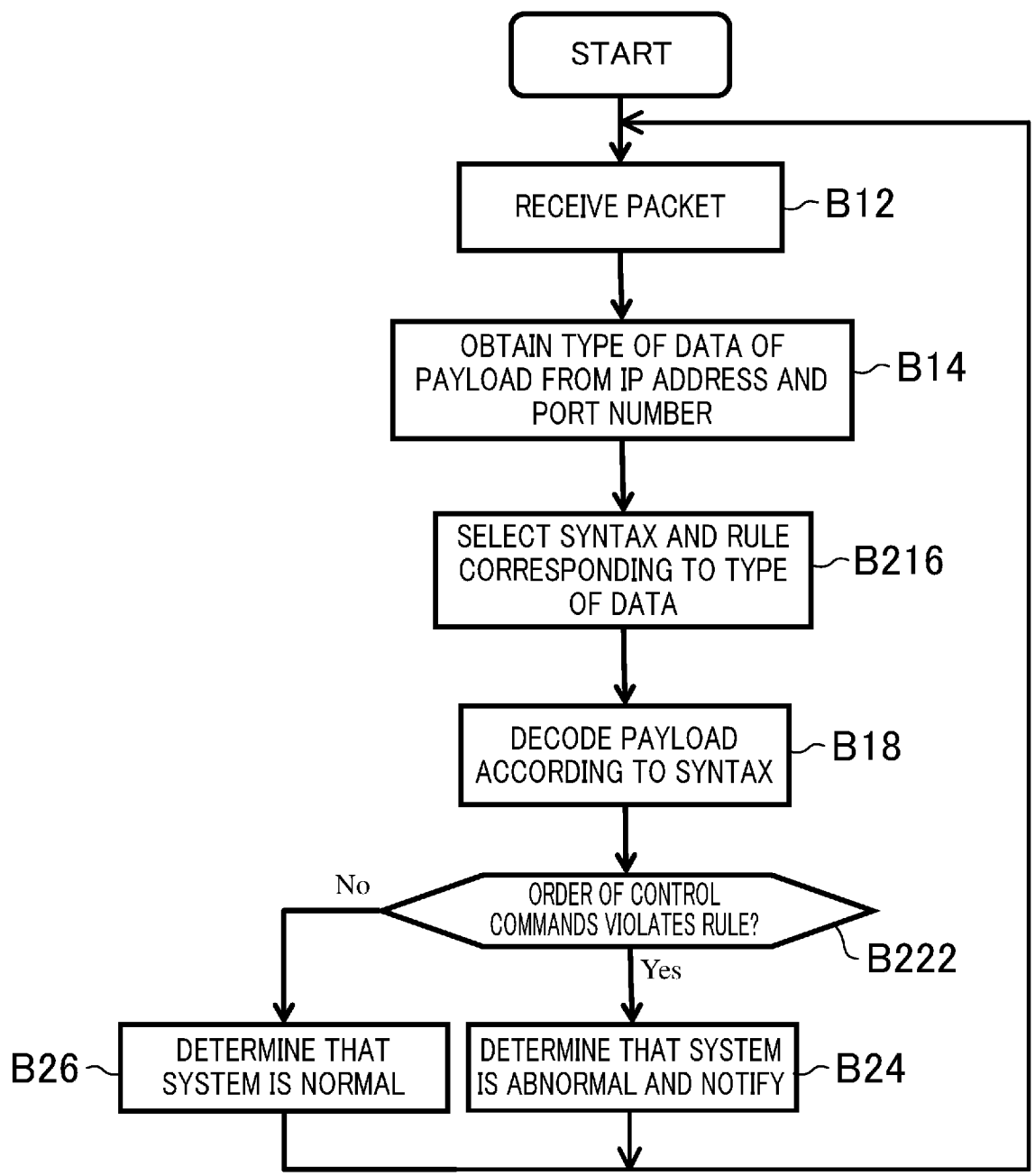
FIG. 14 is a flowchart showing an alteration of the flowchart of FIG. 13.

FIG. 14 is a flowchart showing an alteration of the flowchart of FIG. 13. The flowchart of FIG. 14 is different from the flowchart of FIG. 13 in having blocks B216 and B222 in place of blocks B16 and B22, respectively. Also, after blocks B24 and B26, the processing returns to block B12. The other aspects are similar to those of FIG. 13 and thus description thereof is omitted here.

In block B216, the selector 36 selects and reads the syntax and rule corresponding to the type of the data obtained by the analyzer 34 from the data stored in the memory device 42. The selector 36 outputs the read syntax and rule to the determiner 38 together with the input packet. For example, when the type of the data in the payload is a control command, information like one in FIG. 8 is read as the syntax, and further the order of the types of control commands is read as the rule.

FIG. 15 is a view showing an example of the order of control commands in a normal state. In a normal state, as shown in FIG. 15, board carrying-in command (command number 1), board mounting command (command number 2), and board carrying-out command (command number 3) are repeated in this order. In block 216, such an order is read as the rule.

In block B222, the determiner 38 determines whether or not the order of information indicated by the data included in the decoded payloads violates the rule. In this case, whether or not the order of the types of control commands violates the rule is determined.

FIG. 16 is a view showing an example of the order of control commands in an abnormal state. The control command next to the board mounting command should be board carrying-out command as shown in FIG. 15. In FIG. 16, however, the third control command is board carrying-in command, which should be board carrying-out command. Although the board has not been carried out, board carrying-in command has been given. If this command is executed, the manufacturing device 22 may possibly become out of order. In the case of FIG. 16, therefore, once the third control command is input, the determiner 38 determines that the order of the types of control commands violates the rule. The processing proceeds to block B24 if there is a rule violation, or to block B26 if there is no rule violation.

As described above, the rule selected and read from the data stored in the memory device 42 may stipulate the order of appearance of information indicated by the data included in the payload of a given packet and information indicated by the data included in the payload of a packet received prior to the given packet. More specifically, when a first control command is included in the payload of a given packet, a second control command is included in the payload of a packet received prior to the given packet, and the first control command is the next command to the second control command, for example, the rule may stipulate the order of the types of these control commands.

FIG. 17 is a flowchart showing another alteration of the flowchart of FIG. 13. The flowchart of FIG. 17 is different from the flowchart of FIG. 13 in having blocks B316 and B322 in place of blocks B16 and B22, respectively. The other aspects are similar to those of FIG. 13 and thus description thereof is omitted here.

In block B316, the selector 36 selects and reads the syntax and rule corresponding to the type of the data obtained by the analyzer 34 from the data stored in the memory device 42. The selector 36 outputs the read syntax and rule to the determiner 38 together with the input packet. For example, when the type of the data in the payload is an operation result notice, information like one in FIG. 10 is read as the syntax, and further the order of the types of operation result information included in the operation result notice is read as the rule.

FIG. 18 is a view showing an example of the order of operation result information in a normal state. In a normal state, as shown in FIG. 18, an operation result notice (notice number 1) including the board carrying-in time as the operation result information, an operation result notice (notice number 2) including the board mounting time as the operation result information, and an operation result notice (notice number 3) including the board carrying-out time as the operation result information are repeated in this order. In block 316, such an order is read as the rule.

In block B322, the determiner 38 determines whether or not the order of the types of operation result information violates the rule. FIG. 19 is a view showing an example of the order of operation result information in an abnormal state. The operation result information next to the board mounting time should be the board carrying-out time as shown in FIG. 18. In FIG. 19, however, the third operation result information is the board carrying-in time, which should be the board carrying-out time. In such a case, the manufacturing system 100 is considered to have an abnormality. For example, occurrence of a failure, tampering of a packet by a third party, or the like is suspected. In the case of FIG. 19, therefore, once the third operation result information is input, the determiner 38 determines that the order of the types of operation result information violates the rule. The processing proceeds to block B24 if there is a rule violation, or to block B26 if there is no rule violation.

As described above, when first operation result information is included in the payload of a given packet, second operation result information is included in the payload of a packet received prior to the given packet, and the first operation result information is the next information to the second operation result information, the rule may stipulate the order of the types of such operation result information.

FIG. 20 is a flowchart showing yet another alteration of the flowchart of FIG. 13. The flowchart of FIG. 20 is different from the flowchart of FIG. 13 in having blocks B416 and B422 in place of blocks B16 and B22, respectively, and further having block B420. The other aspects are similar to those of FIG. 13 and thus description thereof is omitted here. In FIG. 20, a control command or an operation result notice is included in the payload of a packet.

Figure 21:
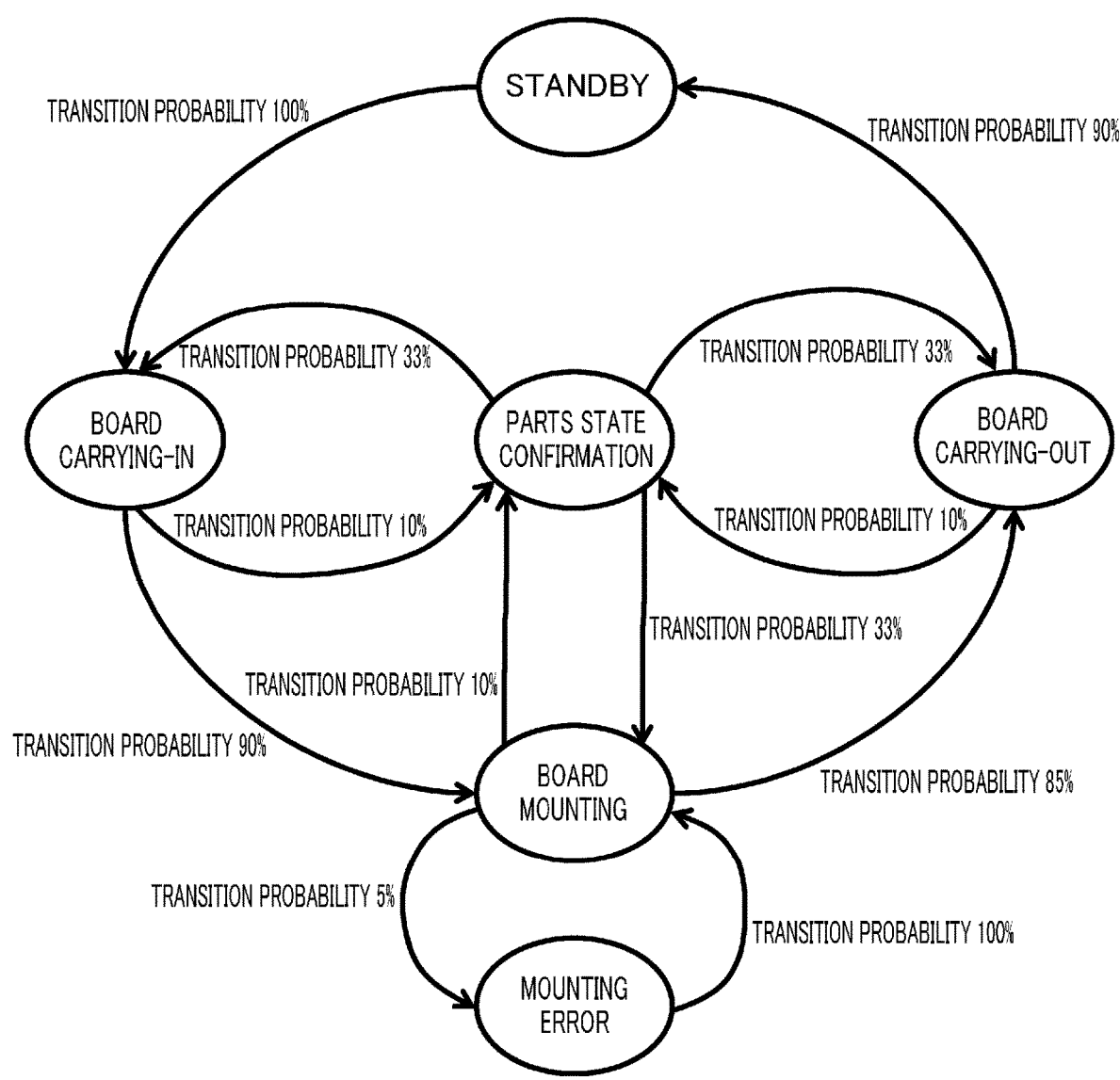
FIG. 21 is a state transition diagram of a manufacturing device, showing a transition probability from each state to the next state.

FIG. 21 is a state transition diagram of the manufacturing device 22, showing the transition probability from each state to the next state. FIG. 22 is a view showing an example of rule regarding the probabilities of state transitions of the manufacturing device 22 in a normal state. In FIG. 22, stipulated are the current state of the manufacturing device 22 (transition source), the next state (transition destination), the estimated transition probability, the control command causing a transition of the state of the manufacturing device 22, and the operation result information in an operation result notice occurring when the manufacturing device 22 makes a state transition. The estimated probabilities of occurrence of each control command and each operation result information are the same as the estimated probability of the corresponding transition. For example, when the manufacturing device 22 is in the board carrying-in state, the estimated probability of the next transition to the board mounting state is 90%. At this transition, the board mounting command for a transition of the state occurs, and an operation result notice including the time required for the board carrying-in and the equipment state information as the operation result information occurs. For the boxes having no indication of a control command, a transition is made without occurrence of a control command. Information like one in FIG. 22 is statistically obtained in advance and stored in the memory device 42. In the manufacturing device 24, also, similar information is stored in advance.

In block B416, the selector 36 selects and reads the syntax and rule corresponding to the type of the data obtained by the analyzer 34 from the data stored in the memory device 42. The selector 36 outputs the read syntax and rule to the determiner 38 together with the input packet. For example, information like one in FIGS. 8 and 10 is read as the syntax, and further a rule like one in FIG. 22 is read.

In block B420, the determiner 38 determines, for each state in FIG. 21, the actual occurrence probability of the transition to the next state, of the control command, or of the operation result information. The determiner 38 obtains such an occurrence probability while sequentially performing processing of receiving a plurality of packets.

In block B422, the determiner 38 determines whether or not the error in any actual occurrence probability, i.e., the difference between any actual occurrence probability and its estimated probability is equal to or greater than a predetermined threshold. The processing proceeds to block B24 if the difference between any actual occurrence probability and its estimated probability is equal to or greater than a predetermined threshold; otherwise it proceeds to block B26.

FIG. 23 is a view showing an example of information regarding the actual occurrence probabilities of the control commands in an abnormal state. The threshold of the error is assumed to be 10%. According to the rule in FIG. 22, when the manufacturing device 22 is in the standby state, the probability of occurrence of the board carrying-in command causing the manufacturing device 22 to make a transition to the board carrying-in state should be 100% as the estimated probability. Actually, however, it is 80% in FIG. 23. Since the error in the occurrence probability is 20%, the determiner 38 determines in block B422 that the difference between the actual probability and the estimated probability is greater than the predetermined threshold.

FIG. 24 is a view showing an example of information regarding the actual occurrence probabilities of the operation result information in an abnormal state. The threshold of the error is assumed to be 10%. According to the rule in FIG. 22, when the manufacturing device 22 is in the standby state, the probability of occurrence of an operation result notice including the equipment state information at the time of the transition of the manufacturing device 22 to the board carrying-in state should be 100% as the estimated probability. Actually, however, it is 50% in FIG. 24. Since the error in the occurrence probability is 50%, the determiner 38 determines in block B422 that the difference between the actual probability and the estimated probability is greater than the predetermined threshold.

FIG. 25 is a view showing an example of information regarding the actual occurrence probabilities of the state transitions of the manufacturing device 22 in an abnormal state. The threshold of the error is assumed to be 10%. According to the rule in FIG. 22, when the manufacturing device 22 is in the standby state, the probability of occurrence of the transition to the board carrying-in state should be 100% as the estimated probability. Actually, however, it is 80% in FIG. 25. Since the error in the occurrence probability is 20%, the determiner 38 determines in block B422 that the difference between the actual probability and the estimated probability is greater than the predetermined threshold.

Note that in block B420 the determiner 38 may obtain the actual occurrence probability of only one, or two or more, of the transition to the next state, the control command, and the operation result information.

An alteration of the example according to the flowchart of FIG. 20 will be described. FIG. 26 is a view showing an example of rule regarding the occurrence probabilities of next commands in a normal state. In FIG. 26, stipulated are the current control command, the next control command, and the estimated probability. This figure corresponds to FIGS. 21 and 22. For example, when the board carrying-in command occurs, the manufacturing device 22 makes a transition to the board carrying-in state. Therefore, the estimated probability that the board mounting command will occur next is 90%. Information like one in FIG. 26 is statistically obtained in advance and stored in the memory device 42.

In block B416, the selector 36 reads a rule like one in FIG. 26 in place of a rule like one in FIG. 22. In block B420, the determiner 38 obtains, for each type of control command having occurred, the actual occurrence probability of each type of control command occurring next. The determiner 38 obtains such an occurrence probability while sequentially performing processing of receiving a plurality of packets.

In block B422, the determiner 38 determines whether or not the error in the actual occurrence probability, i.e., the difference between the actual occurrence probability of the next command and the estimated probability is equal to or greater than a predetermined threshold. The processing proceeds to block B24 if the difference between the actual occurrence probability and the estimated probability is equal to or greater than a predetermined threshold; otherwise it proceeds to block B26.

According to this example, it is possible to determine that the manufacturing system 100 has an abnormality only from the type of the command having occurred.

Another alteration of the example according to the flowchart of FIG. 20 will be described. FIG. 27 is a view showing an example of rule regarding the occurrence probabilities of next operation result information in a normal state. In FIG. 27, stipulated are the current operation result information, the next operation result information, and the estimated probability. This figure corresponds to FIGS. 21 and 22. For example, when the board carrying-in time occurs as the operation result information, the manufacturing device 22 makes a transition to the board mounting state. Therefore, the estimated probability that the board mounting time will occur next as the operation result information is 85%. Information like one in FIG. 27 is statistically obtained in advance and stored in the memory device 42.

In block B416, the selector 36 reads a rule like one in FIG. 27 in place of a rule like one in FIG. 22. In block B420, the determiner 38 obtains, for each type of operation result information having occurred, the actual occurrence probability of each type of operation result information occurring next. The determiner 38 obtains such an occurrence probability while sequentially performing processing of receiving a plurality of packets.

In block B422, the determiner 38 determines whether or not the error in the actual occurrence probability, i.e., the difference between the actual occurrence probability of the next operation result information and the estimated probability is equal to or greater than a predetermined threshold. The processing proceeds to block B24 if the difference between the actual occurrence probability and the estimated probability is equal to or greater than the predetermined threshold; otherwise it proceeds to block B26.

According to this example, it is possible to determine that the manufacturing system 100 has an abnormality only from the type of the operation result information having occurred.

Figure 28:
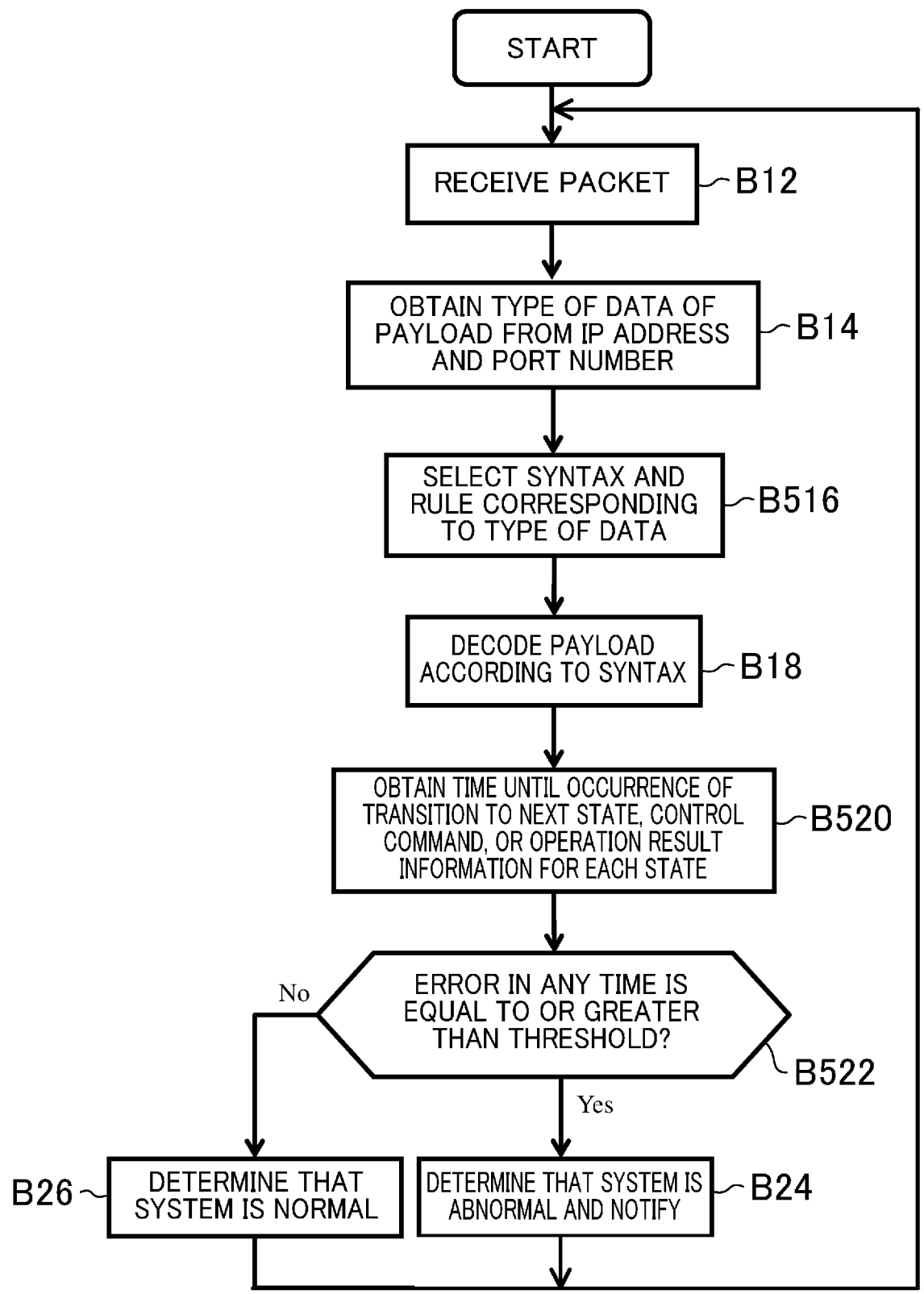
FIG. 28 is a flowchart showing yet another alteration of the flowchart of FIG. 13.

FIG. 28 is a flowchart showing yet another alteration of the flowchart of FIG. 13. The flowchart of FIG. 28 is different from the flowchart of FIG. 13 in having blocks B516 and B522 in place of blocks B16 and B22, respectively, and further having block B520. The other aspects are similar to those of FIG. 13 and thus description thereof is omitted here. In FIG. 28, a control command or an operation result notice is included in the payload of a packet.

Figure 29:
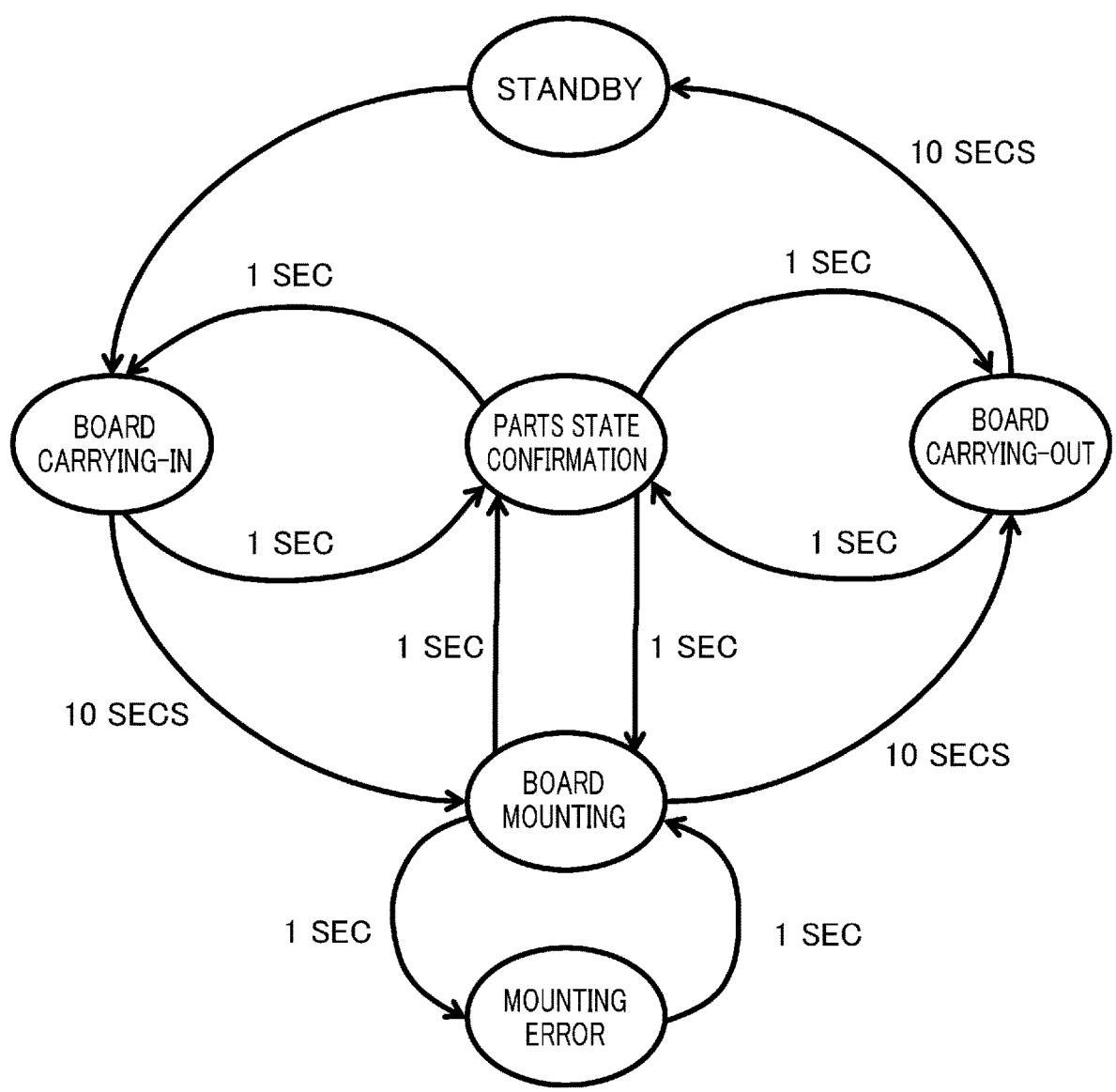
FIG. 29 is a state transition diagram of a manufacturing device, showing the time from each state until it becomes the next state.

FIG. 29 is a state transition diagram of the manufacturing device 22, showing the time from when each state has been assumed until it becomes the next state. FIG. 30 is a view showing an example of rule regarding the times required for the state transitions of the manufacturing device 22 in a normal state. In FIG. 30, stipulated are the current state of the manufacturing device 22 (transition source), the next state (transition destination), the estimated time required for a transition, the control command causing a transition of the state of the manufacturing device 22, and the operation result information in an operation result notice occurring when the manufacturing device 22 makes a state transition. In each state, the estimated time from when the state has been assumed until the next control command or operation result information is output is the same as the estimated time required for the transition to the next state. For example, when the manufacturing device 22 is in the board carrying-in state, the estimated time required for the next transition to the board mounting state is 10 seconds. At this transition, the board mounting command for a transition of the state is output, and an operation result notice including the time required for the board carrying-in and the equipment state information as the operation result information is output. For the boxes having no indication of the control command, a transition is made without output of the control command. Information like one in FIG. 30 is statistically obtained in advance and stored in the memory device 42. In the manufacturing device 24, also, similar information is stored in advance.

In block B516, the selector 36 selects and reads the syntax and rule corresponding to the type of the data obtained by the analyzer 34 from the data stored in the memory device 42. The selector 36 outputs the read syntax and rule to the determiner 38 together with the input packet. For example, information like one in FIGS. 8 and 10 is read as the syntax, and further a rule like one in FIG. 30 is read.

In block B520, the determiner 38 determines, for each state in FIG. 29, the actual time required for the transition to the next state, the output of the control command, or the output of the operation result information. The determiner 38 obtains such a time while sequentially performing processing of receiving a plurality of packets.

In block B522, the determiner 38 determines whether or not the error in any actual time, i.e., the difference between any actual time and its estimated time is equal to or greater than a predetermined threshold. The processing proceeds to block B24 if the difference between any actual time and its estimated time is equal to or greater than the predetermined threshold; otherwise it proceeds to block B26.

FIG. 31 is a view showing an example of information regarding the actual times until output of control commands in an abnormal state. The threshold of the error is assumed to be 15 seconds. According to the rule in FIG. 30, the time from when the manufacturing device 22 has become the board mounting state until the board carrying-out command is output to cause the manufacturing device 22 to make a transition to the board carrying-out state should be 10 seconds as the estimated time. Actually, however, it is 100 seconds in FIG. 31. Since the error in the time is 90 seconds, the determiner 38 determines that the difference between the actual time and the estimated time is greater than the predetermined threshold.

FIG. 32 is a view showing an example of information regarding the actual times until output of operation result information in an abnormal state. The threshold of the error is assumed to be 15 seconds. According to the rule in FIG. 30, the time from when the manufacturing device 22 has become the board mounting state until an operation result notice including the board mounting time is output at the time of a transition of the manufacturing device 22 to the board carrying-out state should be 10 seconds as the estimated time. Actually, however, it is 100 seconds in FIG. 32. Since the error in the time is 90 seconds, the determiner 38 determines that the difference between the actual time and the estimated time is greater than the predetermined threshold.

FIG. 33 is a view showing an example of information regarding the actual times required for the state transitions of the manufacturing device 22 in an abnormal state. The threshold of the error is assumed to be 15 seconds. According to the rule in FIG. 30, the time from when the manufacturing device 22 has become the board mounting state until it makes a transition to the board carrying-out state should be 10 seconds as the estimated time. Actually, however, it is 100 seconds in FIG. 33. Since the error in the time is 90 seconds, the determiner 38 determines that the difference between the actual time and the estimated time is greater than the predetermined threshold.

Note that in block B520 the determiner 38 may obtain only one, or two or more, of the time required for the transition to the next state, the time until the output of the control command, and the time until the output of the operation result information.

An alteration of the example according to the flowchart of FIG. 28 will be described. FIG. 34 is a view showing an example of rule regarding the times until the output of the next commands in a normal state. In FIG. 34, the current control command, the next control command, and the estimated time are stipulated. This figure corresponds to FIGS. 29 and 30. For example, when the board mounting command is output, the manufacturing device 22 makes a transition to the board mounting state. Therefore, the estimated time from the output of the board mounting command until the board carrying-out command is output next is 10 seconds. Information like one in FIG. 34 is statistically obtained in advance and stored in the memory device 42.

In block B516, the selector 36 reads a rule like one in FIG. 34 in place of a rule like one in FIG. 30. In block B520, the determiner 38 obtains, for each type of control command output, the actual time from the output of the control command until each type of control command is output next. The determiner 38 obtains such a time while sequentially performing processing of receiving a plurality of packets.

In block B522, the determiner 38 determines whether or not the error in the actual time, i.e., the difference between the actual time until the next command is output next and the estimated time is equal to or greater than a predetermined threshold. The processing proceeds to block B24 if the difference between the actual time and the estimated time is equal to or greater than the predetermined threshold; otherwise it proceeds to block B26.

According to this example, it is possible to determine that the manufacturing system 100 has an abnormality only from the type of the command having occurred.

Another alteration of the example according to the flowchart of FIG. 28 will be described. FIG. 35 is a view showing an example of a rule regarding the time until the output of the next operation result information in a normal state. In FIG. 35, the current operation result information, the next operation result information, and the estimated time are stipulated. This figure corresponds to FIGS. 29 and 30. For example, when the board carrying-in time is output as the operation result information, the manufacturing device 22 makes a transition to the board mounting state. Therefore, the estimated time from the output of the board carrying-in time until the board mounting time is output next as the operation result information is 10 seconds. Information like one in FIG. 35 is statistically obtained in advance and stored in the memory device 42.

In block B516, the selector 36 reads a rule like one in FIG. 35 in place of a rule like one in FIG. 30. In block B520, the determiner 38 obtains, for each type of operation result information output, the actual time from the output of the operation result information until each type of operation result information is output next. The determiner 38 obtains such a time while sequentially performing processing of receiving a plurality of packets.

In block B522, the determiner 38 determines whether or not the error in the actual time, i.e., the difference between the actual time until the next operation result information is output next and the estimated time is equal to or greater than a predetermined threshold. The processing proceeds to block B24 if the difference between the actual time and the estimated time is equal to or greater than the predetermined threshold; otherwise it proceeds to block B26.

According to this example, it is possible to determine that the manufacturing system 100 has an abnormality only from the type of the operation result information having occurred.

Note that the data analysis device 30 may be configured to learn rules like ones shown in FIGS. 22, 26, 27, 30, 34, and 35, for example, from the payloads of a plurality of packets received by the sender/receiver 32. For example, averaging processing may be performed for each of conditions such as combinations of states and their next states from a plurality of packets, thereby obtaining estimated probabilities and estimated times as described above in advance, and storing the obtained ones in the memory device 42.

Figure 36:
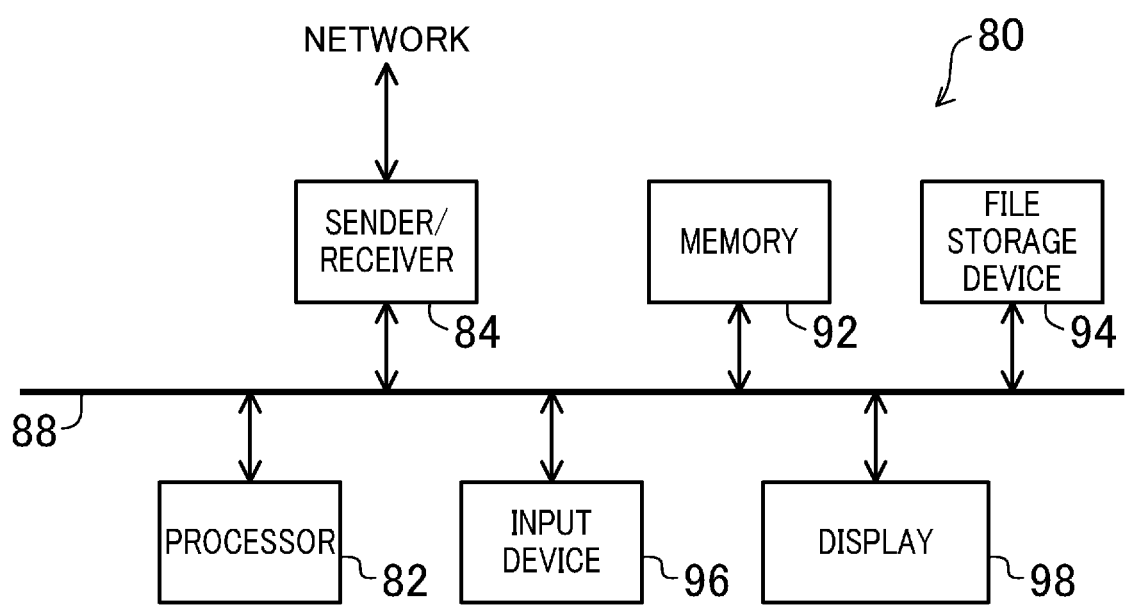
FIG. 36 is a block diagram showing a configuration example of a computer system that implements the data analysis device according to an embodiment of the present invention.

FIG. 36 is a block diagram showing a configuration example of a computer system that implements the data analysis device according to an embodiment of the present invention. A computer system 80 of FIG. 36 has a processor 82, a sender/receiver 84, a bus 88, a memory 92, a file storage device 94, an input device 96, and a display 98.

The processor 82 communicates with the other components via the bus 88. The sender/receiver 84 sends/receives data to/from a communication network such as the Internet. The sender/receiver 84 may be connected to the communication network wirelessly.

The memory 92 includes random access memory (RAM) and read-only memory (ROM), for example, to store data and commands. The file storage device 94 includes one or more volatile or nonvolatile, non-transitory, computer-readable storage media. When the embodiment of the present invention is implemented by software, the microcode, code of an assembly language, or code of a higher-level language, for example, may be used. The file storage device 94 stores a program that is described with such code and includes commands for implementing the functions of the embodiment of the present invention. The file storage device 94 may include semiconductor memory such as RAM, ROM, electrically erasable programmable read-only memory (EEPROM), and flash memory, a magnetic recording medium such as a hard disk drive, an optical recording medium, and a combination thereof.

The input device 96 may include a touch screen, a keyboard, a remote controller, and a mouse. The display 98 may include a flat panel display such as a liquid crystal display and an organic electroluminescence (EL) display.

The computer system 80 may operate as the data analysis device 30 in FIG. 1. The processor 82 may operate as the analyzer 34, the selector 36, and the determiner 38 in FIG. 12. The sender/receiver 84 may operate as the sender/receiver 32 in FIG. 12. The file storage device 94 may operate as the memory device 42 in FIG. 12.

The function blocks described herein may be implemented by hardware such as circuits, for example. Alternatively, part or the entire of the function blocks may be implemented by software. For example, such function blocks may be implemented by the processor 82 and a program executed on the processor 82. In other words, the function blocks described herein may be implemented by hardware, implemented by software, or implemented by a given combination of hardware and software.

It is to be understood that the embodiments described above represent essentially preferred illustrations and are by no means intended to restrict the scope of the present invention, applications thereof, or uses thereof.

As described above, the present disclosure is useful for the data analysis device, method, and program.

What is claimed is:

1. A data analysis device configured to analyze data transmitted in a manufacturing system having a manufacturing device and a manufacture control device that controls the manufacturing device, the data analysis device comprising:
   a receiver configured to receive a first packet transmitted between the manufacture control device and the manufacturing device;
   an analyzer configured to obtain a type of data included in a payload of the received first packet from an IP address and a port number included in a header of the first packet;
   a selector configured to select, based on the type of the data obtained by the analyzer, a syntax or rule corresponding to the type of the data; and
   a determiner configured to determine that the manufacturing system has an abnormality if the data included in the payload does not follow the syntax or rule corresponding to the type of the data.

2. The data analysis device of claim 1, wherein a control command is included in the payload, and the syntax is a syntax of the control command.

3. The data analysis device of claim 1, wherein
   an operation result notice of the manufacturing device is included in the payload, and
   the syntax is a syntax of the operation result notice.

4. The data analysis device of claim 1, wherein
   the rule stipulates the order between information indicated by the data included in the payload of the first packet and information indicated by data included in a payload of a second packet received prior to the first packet.

5. The data analysis device of claim 4, wherein
   a first control command is included in the payload of the first packet,
   a second control command is included in the payload of the second packet, the first control command being a command next to the second control command, and
   the rule stipulates the order between the type of the first control command and the type of the second control command.

6. The data analysis device of claim 4, wherein
   first operation result information is included in the payload of the first packet,
   second operation result information is included in the payload of the second packet, the first operation result information being a notice next to the second operation result information, and
   the rule stipulates the order between the type of the first operation result information and the type of the second operation result information.

7. The data analysis device of claim 1, wherein
   a control command is included in the payload of the first packet,
   the rule stipulates an estimated probability of occurrence of the control command causing the manufacturing device to make a transition to a second state when the manufacturing device is in a first state, and
   the determiner obtains an actual probability of occurrence of the control command when the manufacturing device is in the first state and determines that the manufacturing system has an abnormality if the difference between the actual probability and the estimated probability is greater than a predetermined value.

8. The data analysis device of claim 1, wherein
operation result information is included in the payload of the first packet,
the rule stipulates an estimated probability of occurrence of the operation result information at the time of a transition of the manufacturing device to a second state when the manufacturing device is in a first state, and the determiner obtains an actual probability of occurrence of the operation result information when the manufacturing device is in the first state and
determines that the manufacturing system has an abnormality if the difference between the actual probability and the estimated probability is greater than a predetermined value.

9. The data analysis device of claim 1, wherein
the rule stipulates an estimated probability of occurrence of a transition of the manufacturing device to a second state when the manufacturing device is in a first state, and
the determiner obtains an actual probability of occurrence of the transition of the manufacturing device to the second state when the manufacturing device is in the first state, and determines that the manufacturing system has an abnormality if the difference between the actual probability and the estimated probability is greater than a predetermined value.

10. The data analysis device of claim 1, wherein
a first control command is included in the payload of the first packet,
a second control command is included in a payload of a second packet received prior to the first packet, the first control command being a command next to the second control command,
the rule stipulates an estimated probability of occurrence of the first control command next to the second control command when the second control command has occurred, and
the determiner obtains an actual probability of occurrence of the first control command next to the second control command when the second control command has occurred, and determines that the manufacturing system has an abnormality if the difference between the actual probability and the estimated probability is greater than a predetermined value.

11. The data analysis device of claim 1, wherein
first operation result information is included in the payload of the first packet,
second operation result information is included in a payload of a second packet received prior to the first packet, the first operation result information being information next to the second operation result information,
the rule stipulates an estimated probability of occurrence of the first operation result information next to the second operation result information when the second operation result information has occurred, and
the determiner obtains an actual probability of occurrence of the first operation result information next to the second operation result information when the second operation result information has occurred, and determines that the manufacturing system has an abnormality if the difference between the actual probability and the estimated probability is greater than a predetermined value.

12. The data analysis device of claim 1, wherein
a control command is included in the payload of the first packet,
the rule stipulates an estimated time from when the manufacturing device has become a first state until the control command causing the manufacturing device to make a transition to a second state is output, and
the determiner obtains an actual time from when the manufacturing device has become the first state until the control command is received, and determines that the manufacturing system has an abnormality if the difference between the actual time and the estimated time is greater than a predetermined value.

13. The data analysis device of claim 1, wherein
operation result information is included in the payload of the first packet,
the rule stipulates an estimated time from when the manufacturing device has become a first state until the operation result information to be output at the time of a transition of the manufacturing device to a second state is output, and
the determiner obtains an actual time from when the manufacturing device has become the first state until the operation result information is output, and determines that the manufacturing system has an abnormality if the difference between the actual time and the estimated time is greater than a predetermined value.

14. The data analysis device of claim 1, wherein
the rule stipulates an estimated time from when the manufacturing device has become a first state until the manufacturing device makes a transition to a second state, and
the determiner obtains an actual time from when the manufacturing device has become the first state until the manufacturing device makes a transition to the second state, and determines that the manufacturing system has an abnormality if the difference between the actual time and the estimated time is greater than a predetermined value.

15. The data analysis device of claim 1, wherein
a first control command is included in the payload of the first packet,
a second control command is included in a payload of a second packet received prior to the first packet, the first control command being a command next to the second control command,
the rule stipulates an estimated time from when the second control command has been output until the first control command is output, and the determiner obtains an actual time from when the second control command has been output until the first control command is output, and determines that the manufacturing system has an abnormality if the difference between the actual time and the estimated time is greater than a predetermined value.

16. The data analysis device of claim 1, wherein
first operation result information is included in the payload of the first packet,
second operation result information is included in a payload of a second packet received prior to the first packet, the first operation result information being information next to the second operation result information,
the rule stipulates an estimated time from when the second operation result information has been output until the first operation result information is output, and the determiner obtains an actual time from when the second operation result information has been output until the first operation result information is output, and determines that the manufacturing system has an abnormality if the difference between the actual time and the estimated time is greater than a predetermined value.

17. The data analysis device of claim 1, wherein
the rule is learned from payloads of a plurality of packets received by the receiver.

18. A data analysis method of analyzing data transmitted in a manufacturing system having a manufacturing device and a manufacture control device that controls the manufacturing device, the method comprising:
 receiving a packet transmitted between the manufacture control device and the manufacturing device;
 obtaining a type of data included in a payload of the received packet from an IP address and a port number included in a header of the packet;
 selecting, based on the type of the obtained data, a syntax or rule corresponding to the type of the data; and
 determining that the manufacturing system has an abnormality if the data included in the payload does not follow the syntax or rule corresponding to the type of the data.

19. A non-transitory computer-readable storage medium storing instructions that, when executed by a computer system, cause the computer system to perform a data analysis method of analyzing data transmitted in a manufacturing system having a manufacturing device and a manufacture control device that controls the manufacturing device, the data analysis method comprising:
 receiving a packet transmitted between the manufacture control device and the manufacturing device;
 obtaining a type of data included in a payload of the received packet from an IP address and a port number included in a header of the packet;
 selecting, based on the type of the obtained data, a syntax or rule corresponding to the type of the data; and
 determining that the manufacturing system has an abnormality if the data included in the payload does not follow the syntax or rule corresponding to the type of the data.

\* \* \* \* \*